US011958119B2

(12) United States Patent
Thompson

(10) Patent No.: US 11,958,119 B2
(45) Date of Patent: Apr. 16, 2024

(54) PORTABLE LATHES, PORTABLE LATHE ASSEMBLY KITS, AND ASSOCIATED METHODS

(71) Applicant: Climax Portable Machine Tools, Inc., Newberg, OR (US)

(72) Inventor: Andrew Thompson, Hendersonville, NC (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 854 days.

(21) Appl. No.: 16/913,981

(22) Filed: Jun. 26, 2020

(65) Prior Publication Data

US 2021/0016356 A1 Jan. 21, 2021

Related U.S. Application Data

(60) Provisional application No. 62/874,424, filed on Jul. 15, 2019.

(51) Int. Cl.
*B23B 5/08* (2006.01)
*B23B 3/26* (2006.01)
(Continued)

(52) U.S. Cl.
CPC ............................... *B23B 5/08* (2013.01); *B23B 3/26* (2013.01); *B23D 45/126* (2013.01); *B23Q 9/0021* (2013.01)

(58) Field of Classification Search
CPC ........... B23B 5/08; B23B 3/26; B23Q 9/0042; B23Q 9/0021; B23D 21/10; B23D 45/126; B23K 37/0217; Y10T 82/2522
See application file for complete search history.

(56) References Cited

U.S. PATENT DOCUMENTS 2,408,517 A * 10/1946 Howard ................ B23K 7/006
266/58
2,769,234 A * 11/1956 Young .................... B23D 21/10
30/97
(Continued)

FOREIGN PATENT DOCUMENTS

GB 913214 12/1962
GB 1331230 9/1973
GB 2404162 A * 1/2005 ............... B23B 3/26

*Primary Examiner* — Sara Addisu
(74) *Attorney, Agent, or Firm* — Kolitch Romano Dascenzo Gates LLC

(57) ABSTRACT

Portable lathes, portable lathe assembly kits, and associated methods. A portable lathe comprises two frame members, a plurality of guide bars, a tool assembly supported by the guide bars, and a feed assembly for translating the tool assembly along the guide bars. The feed assembly includes a first fixed linear feed element, a second fixed linear feed element, a driving rotary feed element, and a driven rotary feed element, and is configured such that rotating the driving rotary feed element translates the tool assembly along the guide bars. A portable lathe assembly kit comprises components of the portable lathe configured to be assembled together to install the portable lathe on a cylindrical workpiece. In some examples, a method of utilizing the portable lathe assembly kit comprises operatively receiving the cylindrical workpiece within the frame members by securing the cylindrical workpiece to a first lathe clamshell subassembly and operatively coupling a second lathe clamshell subassembly to the first lathe clamshell subassembly.

10 Claims, 14 Drawing Sheets

(51) Int. Cl.
  *B23D 45/12* (2006.01)
  *B23Q 9/00* (2006.01)

(56) References Cited

U.S. PATENT DOCUMENTS

| | | | | |
|---|---|---|---|---|
| 2,842,238 A | * | 7/1958 | Shaw | B23D 21/04 |
| | | | | 83/490 |
| 3,540,328 A | | 11/1970 | Foss | |
| 4,359,917 A | | 11/1982 | Wilger et al. | |
| 4,716,271 A | * | 12/1987 | Hulsizer | B23Q 9/0021 |
| | | | | 219/60 R |
| 5,056,389 A | | 10/1991 | Johnstead | |
| 5,069,234 A | * | 12/1991 | Nielsen | B08B 9/023 |
| | | | | 451/92 |
| 5,189,933 A | | 3/1993 | Ricci | |
| 5,549,024 A | * | 8/1996 | Ricci | B23B 3/26 |
| | | | | 82/101 |
| 5,660,093 A | | 8/1997 | Ricci | |
| 5,685,996 A | * | 11/1997 | Ricci | B23K 10/00 |
| | | | | 219/60 A |
| 5,881,618 A | | 3/1999 | Ricci et al. | |
| 5,894,772 A | * | 4/1999 | Nodar | B23B 5/162 |
| | | | | 82/113 |
| 6,065,378 A | | 5/2000 | Ricci | |
| 6,619,164 B1 | | 9/2003 | Ricci et al. | |
| 6,799,494 B1 | * | 10/2004 | Ricci | B23B 3/06 |
| | | | | 82/113 |
| 6,904,828 B2 | | 6/2005 | Ricci | |
| 7,059,945 B2 | * | 6/2006 | Skinner | B24C 3/06 |
| | | | | 451/92 |
| 7,331,846 B1 | * | 2/2008 | Shimizu | B24C 3/32 |
| | | | | 451/92 |
| 7,690,283 B1 | | 4/2010 | Hall et al. | |
| 8,051,753 B2 | | 11/2011 | Ricci et al. | |
| 8,250,953 B2 | | 8/2012 | Hall et al. | |
| 8,584,557 B2 | | 11/2013 | Hall et al. | |
| 9,114,458 B2 | | 8/2015 | Weinberg et al. | |
| 10,137,504 B2 | | 11/2018 | Weinberg et al. | |
| 2005/0016339 A1 | * | 1/2005 | Ricci | B23Q 1/017 |
| | | | | 82/117 |
| 2019/0381621 A1 | * | 12/2019 | Coakley | B23B 3/26 |
| 2023/0241689 A1 | * | 8/2023 | King | B23Q 9/0021 |
| | | | | 82/1.11 |

\* cited by examiner

PORTABLE LATHES, PORTABLE LATHE ASSEMBLY KITS, AND ASSOCIATED METHODS

RELATED APPLICATION

This application claims priority to U.S. Provisional Patent Application No. 62/874,424, entitled "PORTABLE LATHES," filed on Jul. 15, 2019, the disclosure of which is hereby incorporated by reference.

FIELD

The present disclosure relates generally to portable lathes, portable lathe assembly kits, and associated methods.

BACKGROUND

Portable lathes are specialized machine tools that are configured to be installed directly onto a workpiece for machining thereof. Some portable lathes are specifically configured to machine an external surface of a cylindrical workpiece at any location along the length of the workpiece, with such portable lathes being referred to as portable midshaft lathes. In addition, some portable midshaft lathes are specifically configured to machine a span of an external surface of a cylindrical workpiece by having the cutting tool translate along the longitudinal axis of the workpiece as it revolves around the workpiece, with such portable midshaft lathes being referred to as portable midshaft journal lathes.

SUMMARY

Portable lathes, portable lathe assembly kits, and associated methods are disclosed herein. A portable lathe for machining an external surface of a cylindrical workpiece having a workpiece longitudinal axis comprises two spaced-apart frame members, a plurality of guide bars extending between and operatively coupling the frame members to one another, a tool assembly supported by the plurality of guide bars, and a feed assembly operatively coupled to the tool assembly. The guide bars are configured to operatively support the portable lathe on the cylindrical workpiece such that the workpiece longitudinal axis is at least substantially parallel to a rotation axis of the portable lathe when the portable lathe is operatively installed on the cylindrical workpiece, and each guide bar extends along a direction at least substantially parallel to the rotation axis. The tool assembly includes a non-rotating portion and a rotating portion configured to rotate relative to the non-rotating portion about the rotation axis. The feed assembly is configured to translate the tool assembly along the plurality of guide bars and along a direction at least substantially parallel to the rotation axis. The feed assembly includes a first fixed linear feed element extending between the frame members and a driving rotary feed element operatively engaged with the first fixed linear feed element and operatively coupled to the tool assembly. The feed assembly further includes a second fixed linear feed element extending between the frame members and at least substantially parallel to the first fixed linear feed element and a driven rotary feed element operatively engaged with the second fixed linear feed element. The feed assembly is configured such that rotation of the driving rotary feed element relative to the first fixed linear feed element causes the driving rotary feed element to translate along the first fixed linear feed element and rotation of the driven rotary feed element relative to the second fixed linear feed element causes the driven rotary feed element to translate along the second fixed linear feed element, thereby urging the tool assembly to translate along the plurality of guide bars.

A portable lathe assembly kit for operatively installing a portable lathe on a cylindrical workpiece comprises two frame members configured to operatively support the portable lathe on the cylindrical workpiece, a plurality of guide bars configured to extend between and operatively couple the frame members to one another, a tool assembly configured to be supported by the plurality of guide bars between the frame members, and a feed assembly configured to be operatively coupled to the tool assembly and configured to translate the tool assembly along the plurality of guide bars. The tool assembly includes a non-rotating portion and a rotating portion configured to rotate relative to the non-rotating portion about a rotation axis, and is configured to translate along the plurality of guide bars and along a direction at least substantially parallel to the rotation axis. The feed assembly comprises a first fixed linear feed element configured to extend between the frame members, a driving rotary feed element operatively coupled to the tool assembly and configured to operatively engage the first fixed linear feed element, a second fixed linear feed element configured to extend between the frame members and at least substantially parallel to the first fixed linear feed element, and a driven rotary feed element configured to operatively engage the second fixed linear feed element.

In some examples, the portable lathe assembly kit is a partially assembled portable lathe assembly kit that comprises a first lathe clamshell subassembly and a second lathe clamshell subassembly that are configured to be operatively coupled to one another to operatively install the portable lathe on the cylindrical workpiece. In some such examples, each frame member of the portable lathe assembly kit comprises a first frame clamshell portion and a second frame clamshell portion that are configured to be operatively coupled to one another, and the tool assembly of the portable lathe assembly kit comprises a first tool assembly clamshell portion and a second tool assembly clamshell portion that are configured to be operatively coupled to one another. In some such examples, a method of utilizing the portable lathe assembly kit to operatively install the portable lathe on the cylindrical workpiece comprises operatively receiving the cylindrical workpiece within the frame members by securing the cylindrical workpiece to the first lathe clamshell subassembly and operatively coupling the second lathe clamshell subassembly to the first lathe clamshell subassembly.

DESCRIPTION

Figure 1:
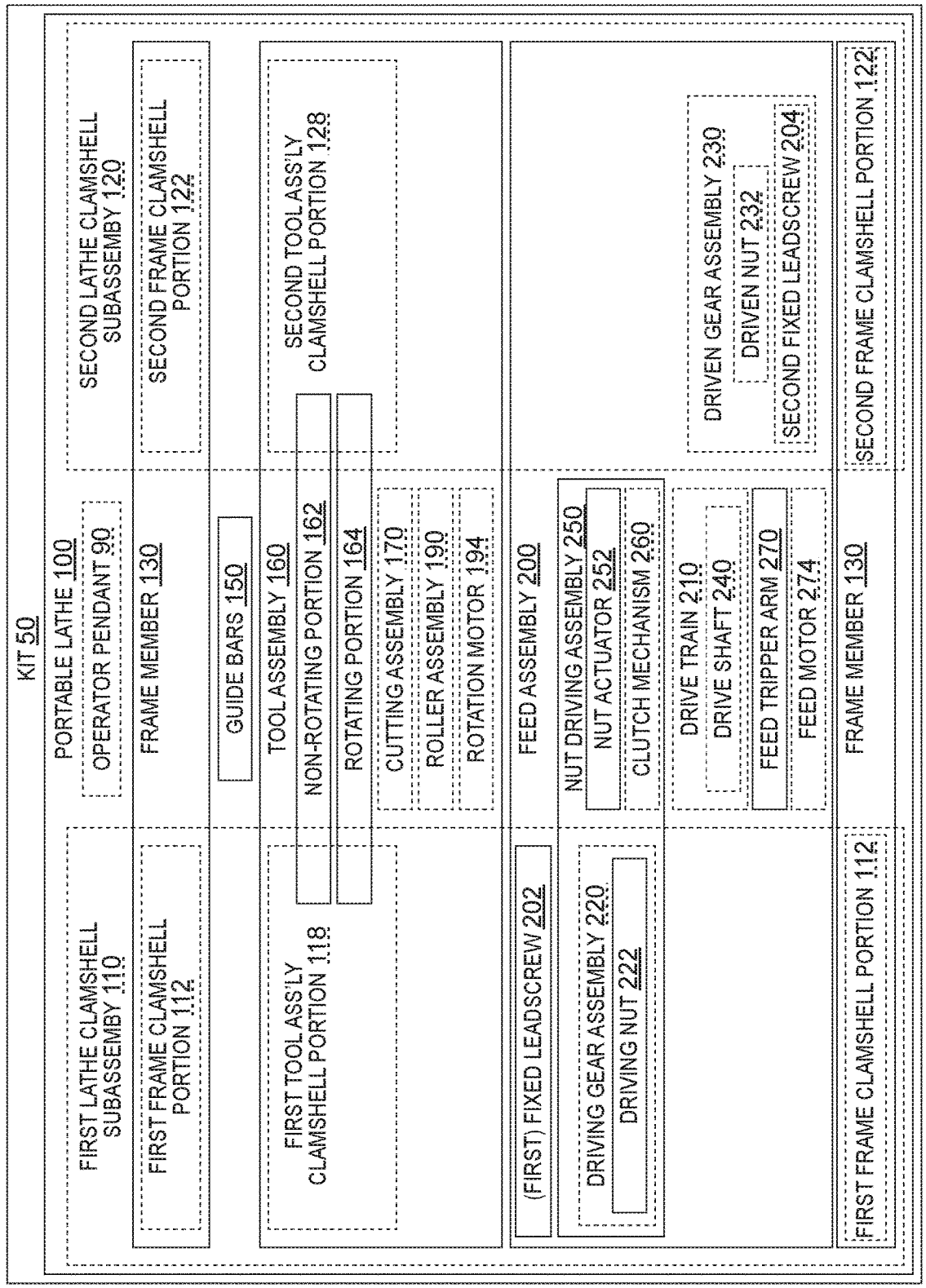
FIG. 1 is a schematic diagram representing portable lathes and kits for assembling portable lathes according to the present disclosure.

FIGS. 1-17 provide examples of portable lathes 100, of portable lathe assembly kits 50 for assembling portable lathes, and/or of methods 300 of utilizing portable lathe assembly kits, according to the present disclosure. Elements that serve a similar, or at least substantially similar, purpose are labeled with like numbers in each of FIGS. 1-17, and these elements may not be discussed herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure. In general, in FIG. 1, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
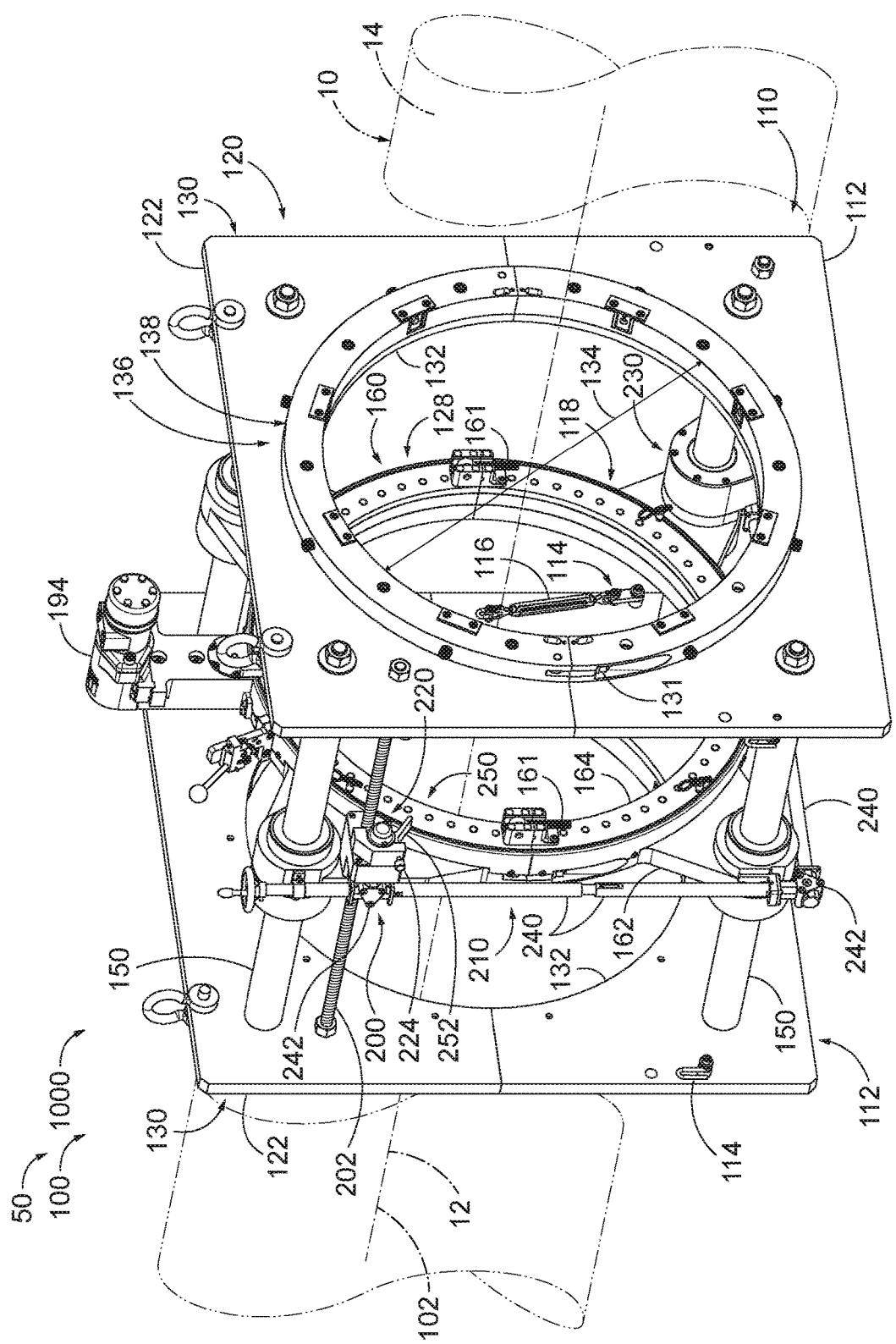
FIG. 2 is a front top side isometric view of an example portable lathe according to the present disclosure.
Figure 3:
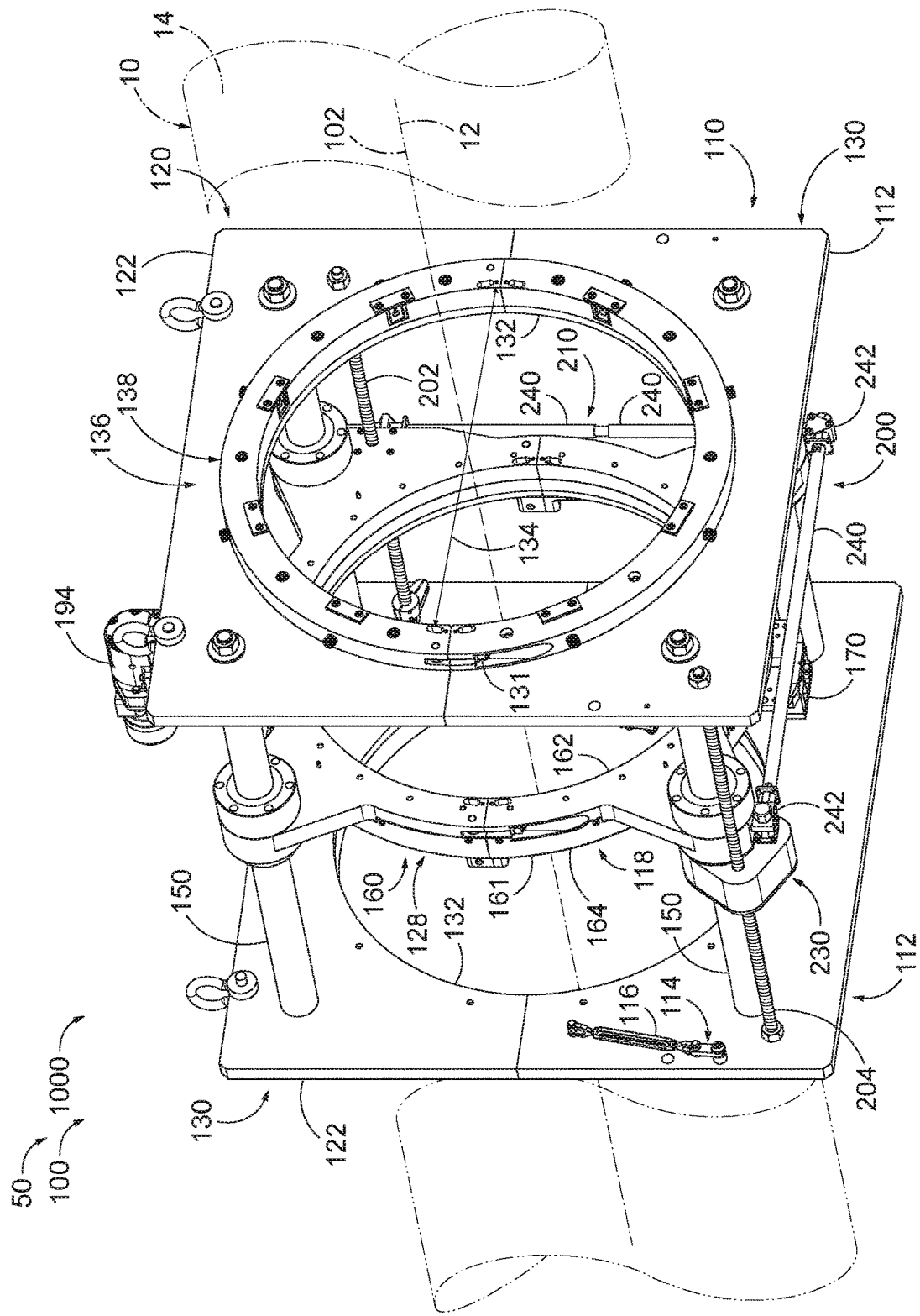
FIG. 3 is a rear bottom side isometric view of the example portable lathe of FIG. 2.
Figure 4:
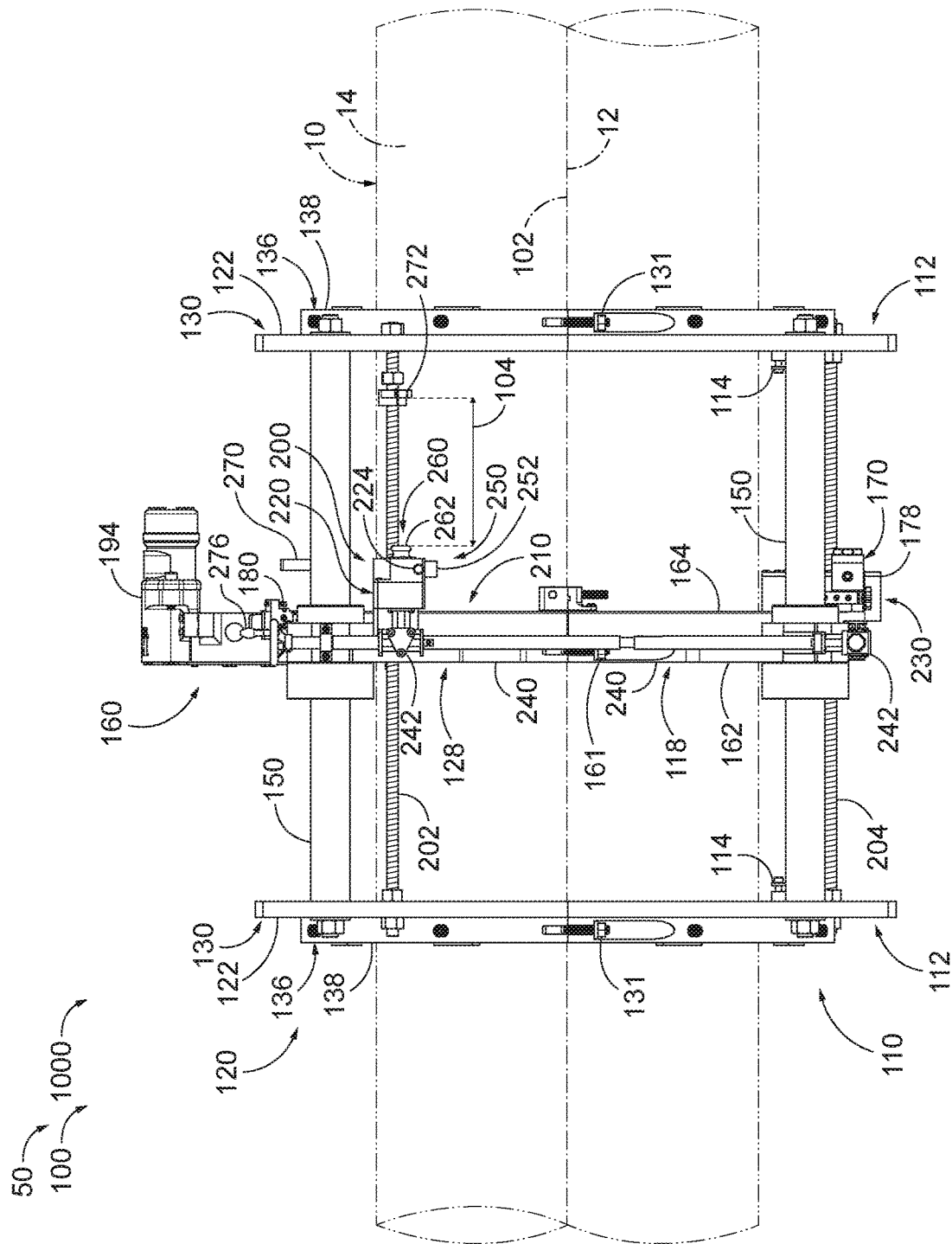
FIG. 4 is a side elevation view of the example portable lathe of FIG. 2.
Figure 11:
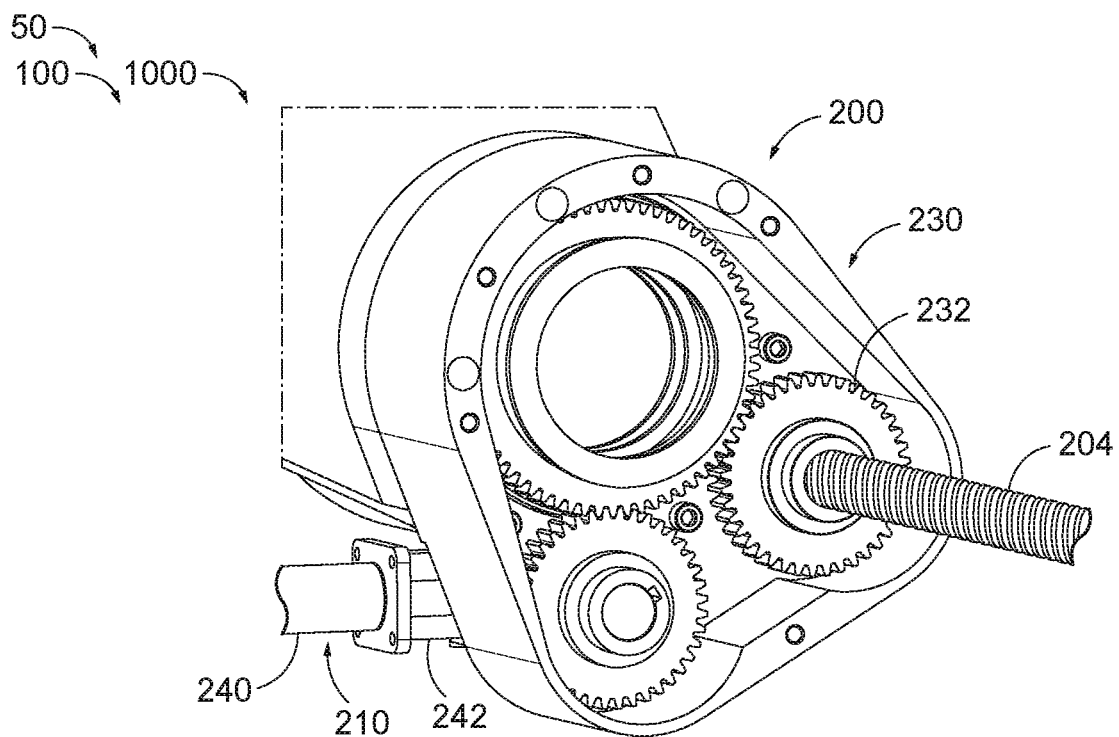
FIG. 11 is a rear top side isometric cutaway view of a driven gear assembly, according to the present disclosure, of the example portable lathe of FIG. 2.
Figure 12:
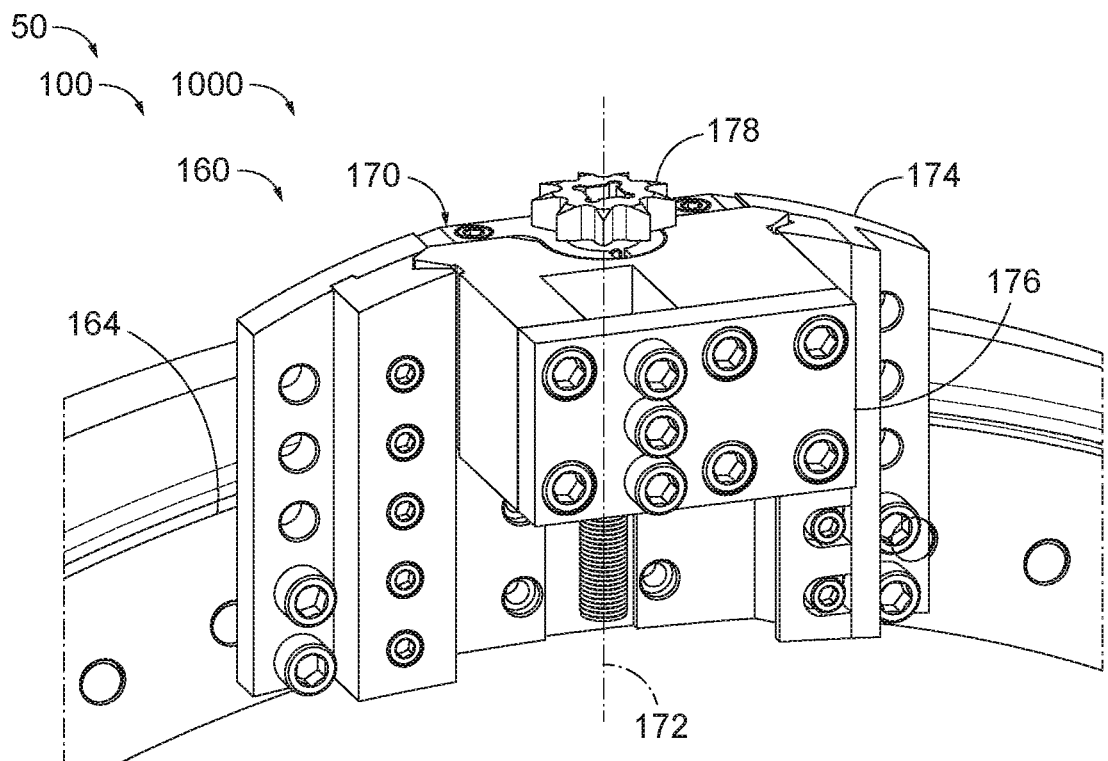
FIG. 12 is a rear top side isometric view of a cutting assembly, according to the present disclosure, of the example portable lathe of FIG. 2.
Figure 13:
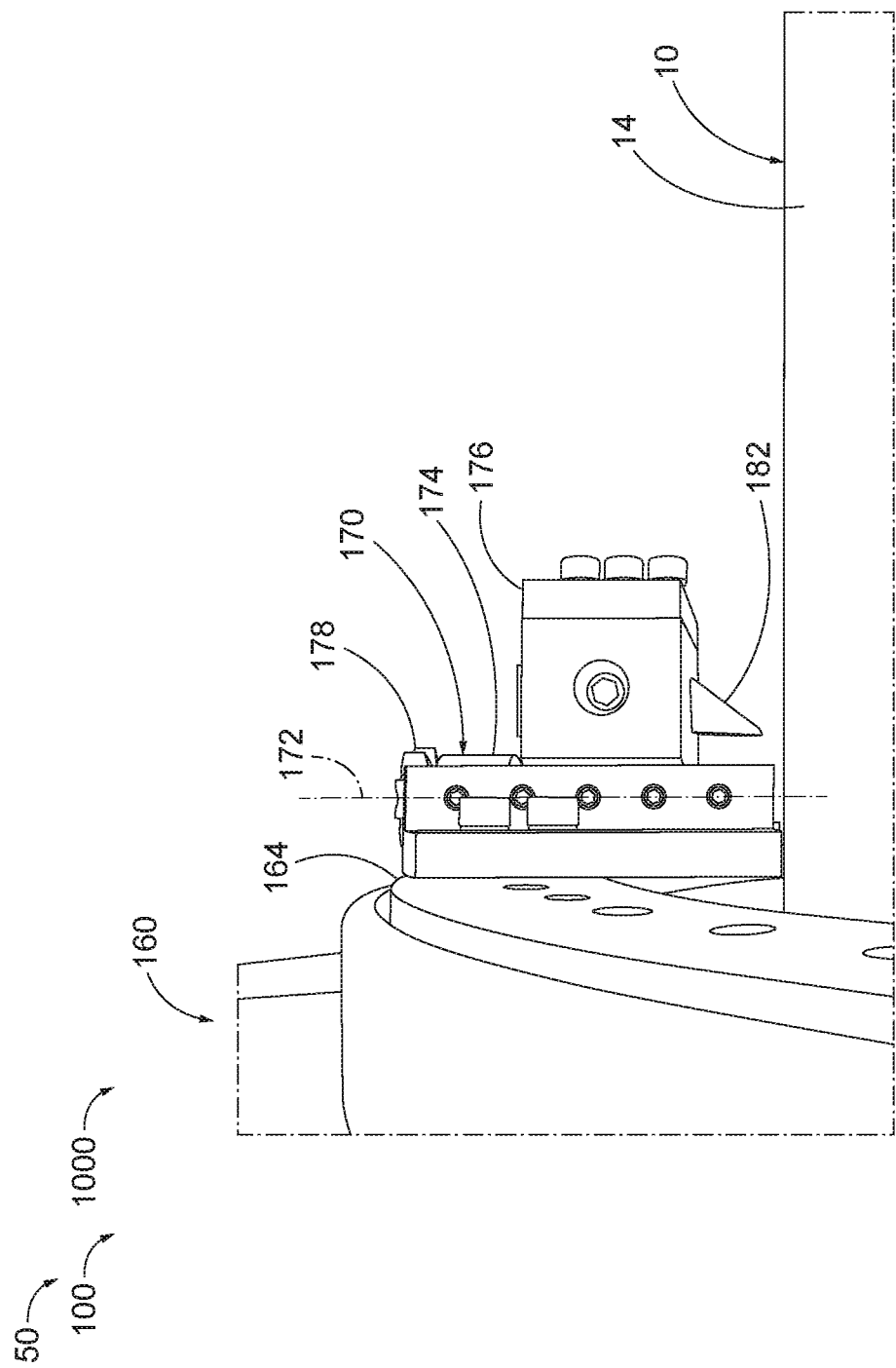
FIG. 13 is a side elevation perspective view of the cutting assembly of FIG. 12 with a cutting tool positioned adjacent to a cylindrical workpiece according to the present disclosure.
Figure 15:
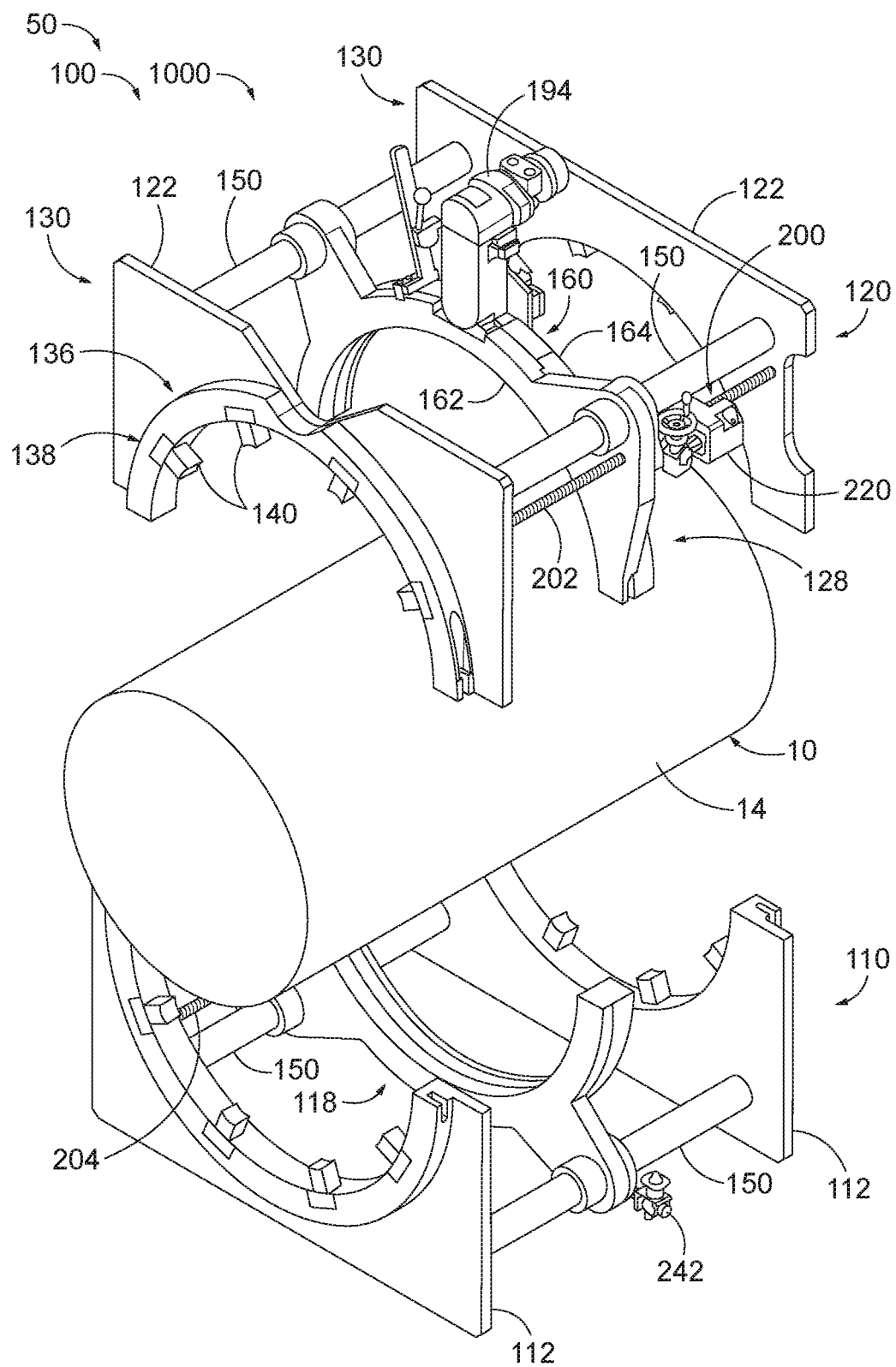
FIG. 15 is a top front side exploded isometric view of a first frame clamshell portion and a second frame clamshell portion of the example portable lathe of FIG. 2 positioned on either side of a cylindrical workpiece, according to the present disclosure.
Figure 16:
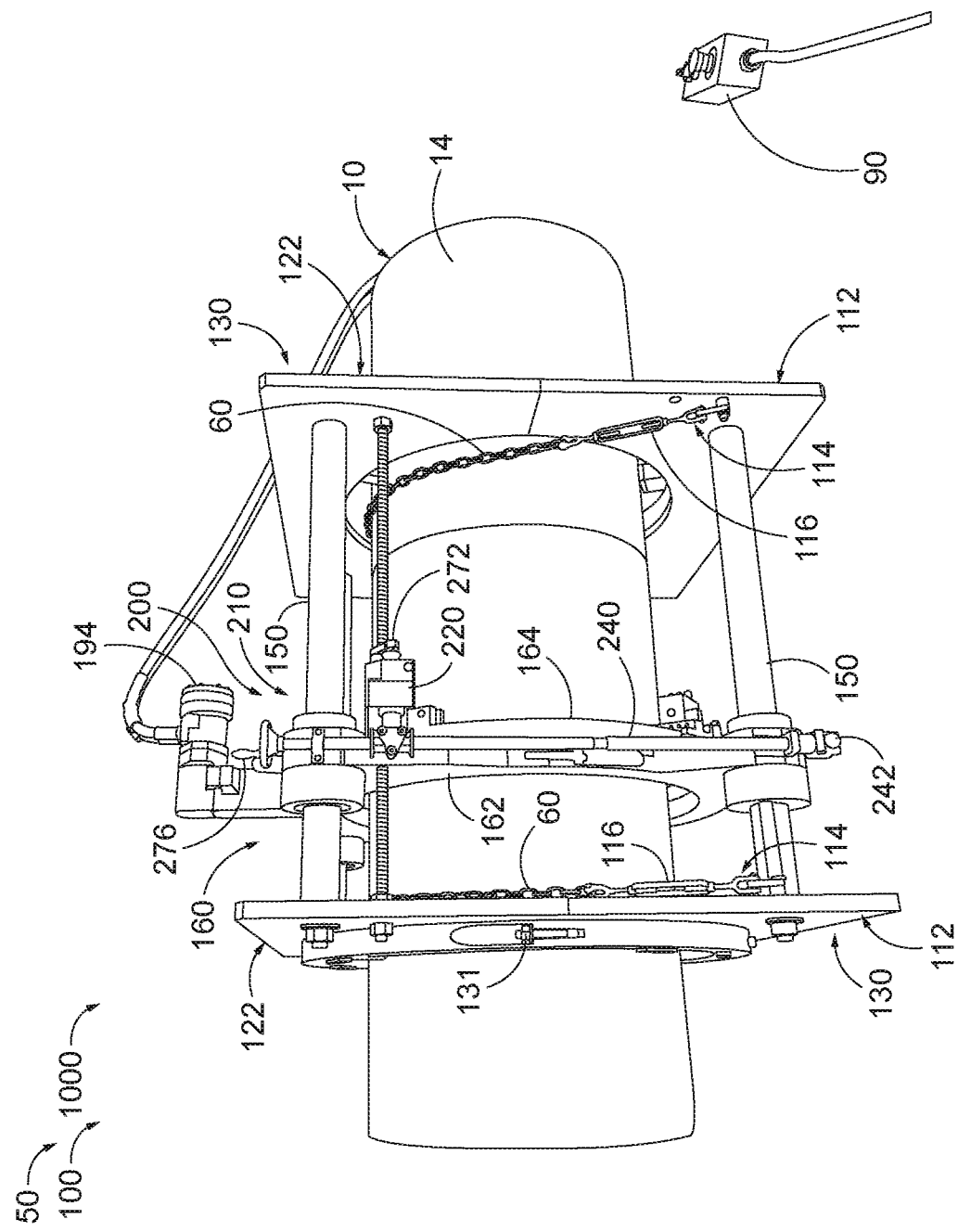
FIG. 16 is a side elevation perspective view of the example portable lathe of FIG. 2 operatively installed on a cylindrical workpiece.

FIG. 1 is a schematic representation of examples of portable lathes 100, while FIGS. 2-16 illustrate aspects, and/or components of an example portable lathe 1000, which is a more specific example of portable lathe 100. In particular, FIGS. 2-4 illustrate views of example portable lathe 1000 as operatively installed on a cylindrical workpiece 10 (schematically illustrated in dash-dot-dot lines), while FIGS. 5-14 illustrate components of example portable lathe 1000 in more detail. FIGS. 13 and 15-16 are less schematic illustrations of example portable lathe 1000 positioned and/or installed relative to cylindrical workpiece 10.

As schematically illustrated in FIGS. 2-4, and as described herein, portable lathes 100 are configured to be operatively installed upon a cylindrical workpiece 10 with a workpiece longitudinal axis 12 such that portable lathe 100 is operable to machine an external surface 14 of cylindrical workpiece 10. As schematically shown in FIG. 1, and as less schematically illustrated in FIGS. 2-4, portable lathes 100 include two spaced-apart frame members 130 and a plurality of guide bars 150 extending between and operatively coupling frame members 130 to one another. Portable lathes 100 additionally include a tool assembly 160 supported by the plurality of guide bars 150. While the present disclosure generally relates to examples in which portable lathes 100 include four guide bars 150, this is not required, and it is additionally within the scope of the present disclosure that portable lathes 100 include any appropriate number of guide bars 150. As examples, portable lathes 100 may include two guide bars 150, three guide bars 150, four guide bars 150, or more than four guide bars 150.

Portable lathes 100 may be configured to be operatively installed on and/or operatively utilized in conjunction with cylindrical workpieces 10 of any appropriate size. For example, and as illustrated in FIGS. 2-3, each frame member 130 may be described as defining a central aperture 132 through which cylindrical workpiece 10 extends when portable lathe 100 is operatively installed on cylindrical workpiece 10, and central aperture 132 may be characterized by an aperture diameter 134 that is comparable to and/or slightly larger than a diameter of cylindrical workpiece 10. As examples, aperture diameter 134 may be at least 30 centimeters (cm), at least 50 cm, at least 100 cm, at least 130 cm, at least 150 cm, at least 200 cm, at most 220 cm, at most 170 cm, at most 120 cm, at most 70 cm, and/or at most 40 cm.

As described in more detail herein, portable lathes 100 according to the present disclosure generally are configured to be transported to and/or operatively assembled around cylindrical workpiece 10 to be machined. In this manner, utilizing portable lathes 100 according to the present disclosure may enable exterior surface 14 of cylindrical workpiece 10 to be machined without moving cylindrical workpiece 10 (e.g., within and/or away from a work site). For example, utilizing portable lathe 100 may enable machining of external surface 14 of cylindrical workpiece 10 that is operatively installed and/or in operative use without requiring removal of cylindrical workpiece 10. As a more specific example, cylindrical workpiece 10 may be a pipe installed in a system such that cylindrical workpiece 10 cannot be readily removed and/or transported. Accordingly, and as discussed in more detail below, portable lathe 100 may include features and/or configurations to facilitate transporting portable lathe 100 to cylindrical workpiece 10 and/or operatively installing portable lathe 100 upon cylindrical workpiece 10.

Tool assembly 160 includes a non-rotating portion 162 as well as a rotating portion 164 that is configured to rotate relative to non-rotating portion 162 about a rotation axis 102 of portable lathe 100. In this manner, rotating portion 164 also may be described as being operable to rotate about rotation axis 102 relative to any component of portable lathe 100 that is at least substantially rotationally fixed relative to non-rotating portion 162, such as frame members 130 and/or guide bars 150. As described in more detail herein, tool assembly 160 generally is configured to machine external surface 14 of cylindrical workpiece 10 as rotating portion 164 rotates relative to non-rotating portion 162 (and hence relative to cylindrical workpiece 10). As illustrated in FIGS.

2-4, frame members 130 are configured to operatively support portable lathe 100 on cylindrical workpiece 10 such that workpiece longitudinal axis 12 is at least substantially parallel to, and/or collinear with, rotation axis 102. Accordingly, in some examples, and as illustrated in FIGS. 2-4, each guide bar 150 also extends along a direction that is at least substantially parallel to rotation axis 102.

As additionally shown in FIG. 1 and as illustrated in FIGS. 2-4, portable lathes 100 further include a feed assembly 200 operatively coupled to tool assembly 160. As described in more detail herein, feed assembly 200 is configured to translate tool assembly 160 relative to and along guide bars 150 during operative use of portable lathe 100. In this manner, feed assembly 200 also may be described as operating to translate tool assembly 160 along a direction at least substantially parallel to rotation axis 102.

As described in more detail herein, feed assembly 200 generally is configured to translate tool assembly 160 along guide bars 150 concurrent with, and/or at least partially responsive to, a rotation of rotating portion 164 of tool assembly 160 relative to non-rotating portion 162 of the tool assembly. More specifically, as shown in FIG. 1, and as illustrated in FIGS. 2-4, feed assembly 200 includes a fixed linear feed element 202 extending between frame members 130 as well as a driving rotary feed element 222 (represented in FIG. 1 but hidden in the views of FIGS. 2-4) operatively engaged with fixed linear feed element 202 and operatively coupled to tool assembly 160. Specifically, driving rotary feed element 222 is operatively coupled to tool assembly 160 such that driving rotary feed element 222 and tool assembly 160 translate relative to fixed linear feed element 202 along a direction parallel to rotation axis 102 and/or workpiece longitudinal axis 12 at least substantially in unison. More specifically, feed assembly 200 is configured such that rotation of driving rotary feed element 222 relative to fixed linear feed element 202 causes driving rotary feed element 222 to translate along fixed linear feed element 202, thereby urging tool assembly 160 to translate along guide bars 150. In some examples, and as described herein, feed assembly 200 further is configured such that rotation of rotating portion 164 relative to non-rotating portion 162 operates to rotate driving rotary feed element 222 relative to fixed linear feed element 202. In such examples, during operative use of portable lathe 100, tool assembly 160 may be described automatically translating along external surface 14 of cylindrical workpiece 10 along a direction parallel to workpiece longitudinal axis 12 responsive to rotating portion 164 rotating relative to non-rotating portion 162 under the motive force of a single motor (or other input motive force).

Fixed linear feed element 202 and driving rotary feed element 222 may include any appropriate structures such that rotation of driving rotary feed element 222 relative to fixed linear feed element 202 operates to translate tool assembly 160 along guide bars 150 during operative use of portable lathe 100. As an example, such as in the example of example portable lathe 1000, fixed linear feed element 202 may be a fixed leadscrew (e.g., a ball screw), and driving rotary feed element 222 may be a driving nut (e.g., a ball screw nut) that is threaded onto the fixed leadscrew such that rotation of the driving nut relative to the fixed leadscrew operates to urge the driving nut to translate along the fixed leadscrew. As another example, fixed linear feed element 202 may be a fixed gear rack, and driving rotary feed element 222 may be a pinion gear that engages the fixed gear rack such that rotation of the pinion gear relative to the fixed gear rack operates to urge the pinion gear to translate along the fixed gear rack.

As used herein, portable lathes 100 may be described as being "in operative use" and/or as being "operatively utilized" when portable lathe 100 is operatively supported on cylindrical workpiece 10 by frame members 130 such that workpiece longitudinal axis 12 is at least substantially parallel to and/or collinear with rotation axis 102. In this manner, references within the present disclosure to portable lathe 100 (and/or a component thereof) in conjunction with cylindrical workpiece 10 (and/or a portion thereof) are intended to refer to a configuration in which portable lathe 100 is operatively installed on cylindrical workpiece 10, as described herein. However, while the present disclosure generally describes examples in which portable lathe 100 is operatively installed on cylindrical workpiece 10, such examples are not intended to be limiting, and it is within the scope of the present disclosure that portable lathe 100 is not always operatively coupled to and/or operatively utilized in conjunction with cylindrical workpiece 10.

As described herein, fixed linear feed element 202 generally is at least substantially fixed relative to frame members 130 during operative use of portable lathe 100. For example, fixed linear feed element 202 may be operatively coupled to frame members 130 such that fixed linear feed element 202 is restricted and/or prevented from rotating relative to frame members 130. Utilizing fixed linear feed element 202 in this manner distinguishes portable lathes 100 according to the present disclosure from prior art designs that may operate via rotation of a linear feed element in the form of a leadscrew to translate a (non-rotating) rotary feed element that is operatively engaged with the rotating leadscrew. Fixed linear feed element 202 also may be described as being fixed relative to any other component of portable lathe 100 that is at least substantially fixed relative to frame members 130, such as guide bars 150. As illustrated in FIGS. 2-4, fixed linear feed element 202 generally is spaced apart from rotation axis 102 and is positioned alongside and exterior of cylindrical workpiece 10 during operative use of portable lathe 100. In some examples, and as illustrated in FIGS. 2-4, fixed linear feed element 202 may extend at least partially through each frame member 130.

Figure 5:
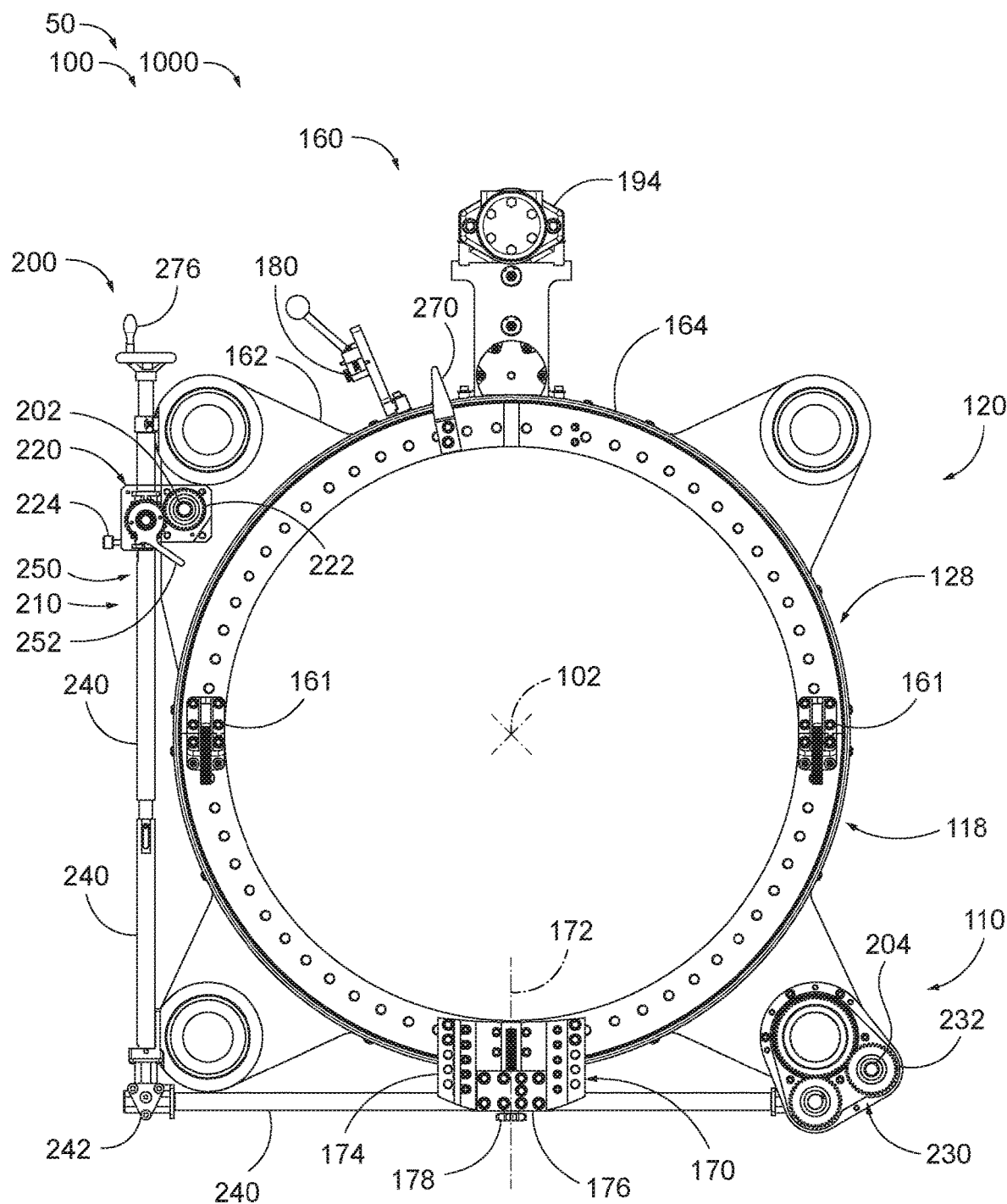
FIG. 5 is a rear elevation view of a portion of the example portable lathe of FIG. 2.
Figure 6:
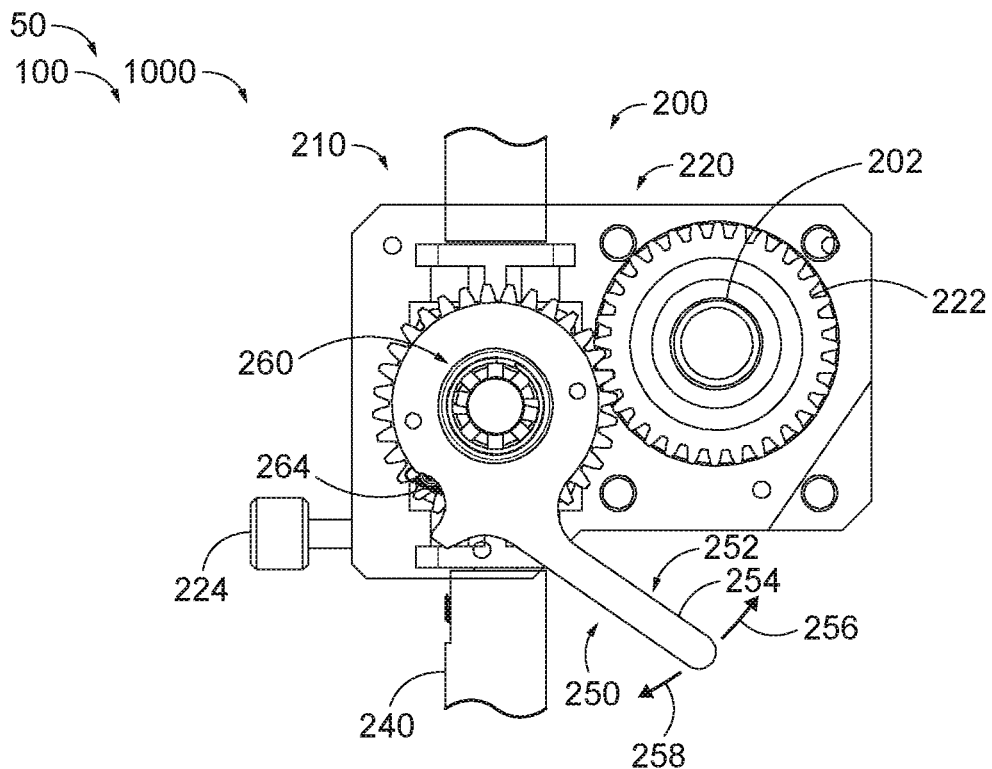
FIG. 6 is a fragmentary detail view of a portion of FIG. 5.
Figure 7:
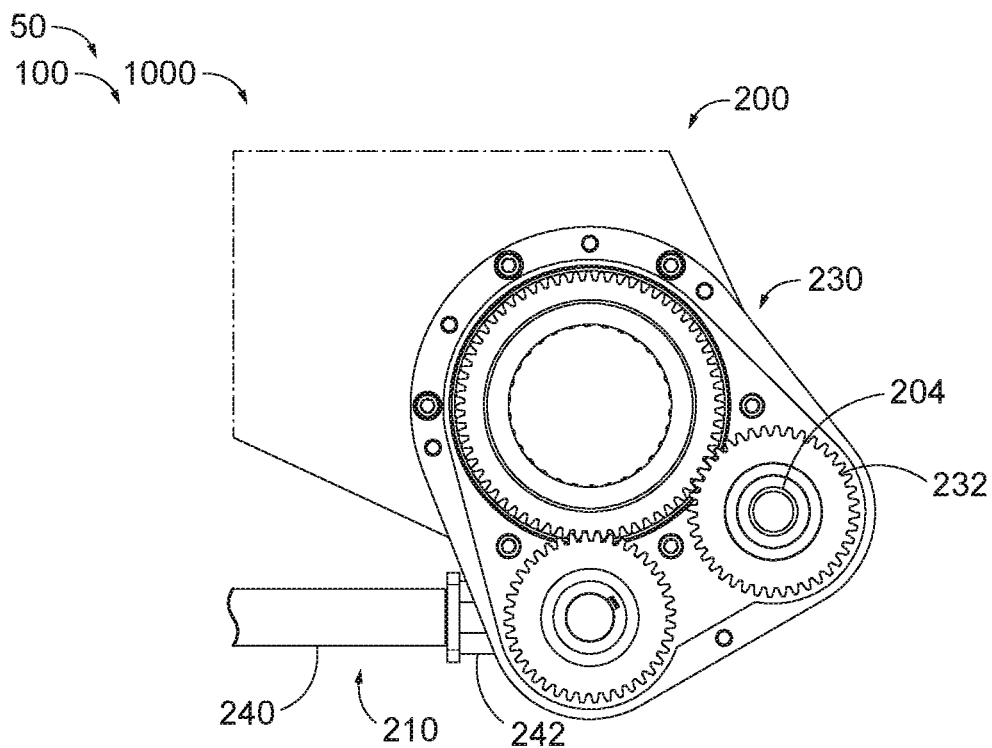
FIG. 7 is a fragmentary detail view of another portion of FIG. 5.
Figure 8:
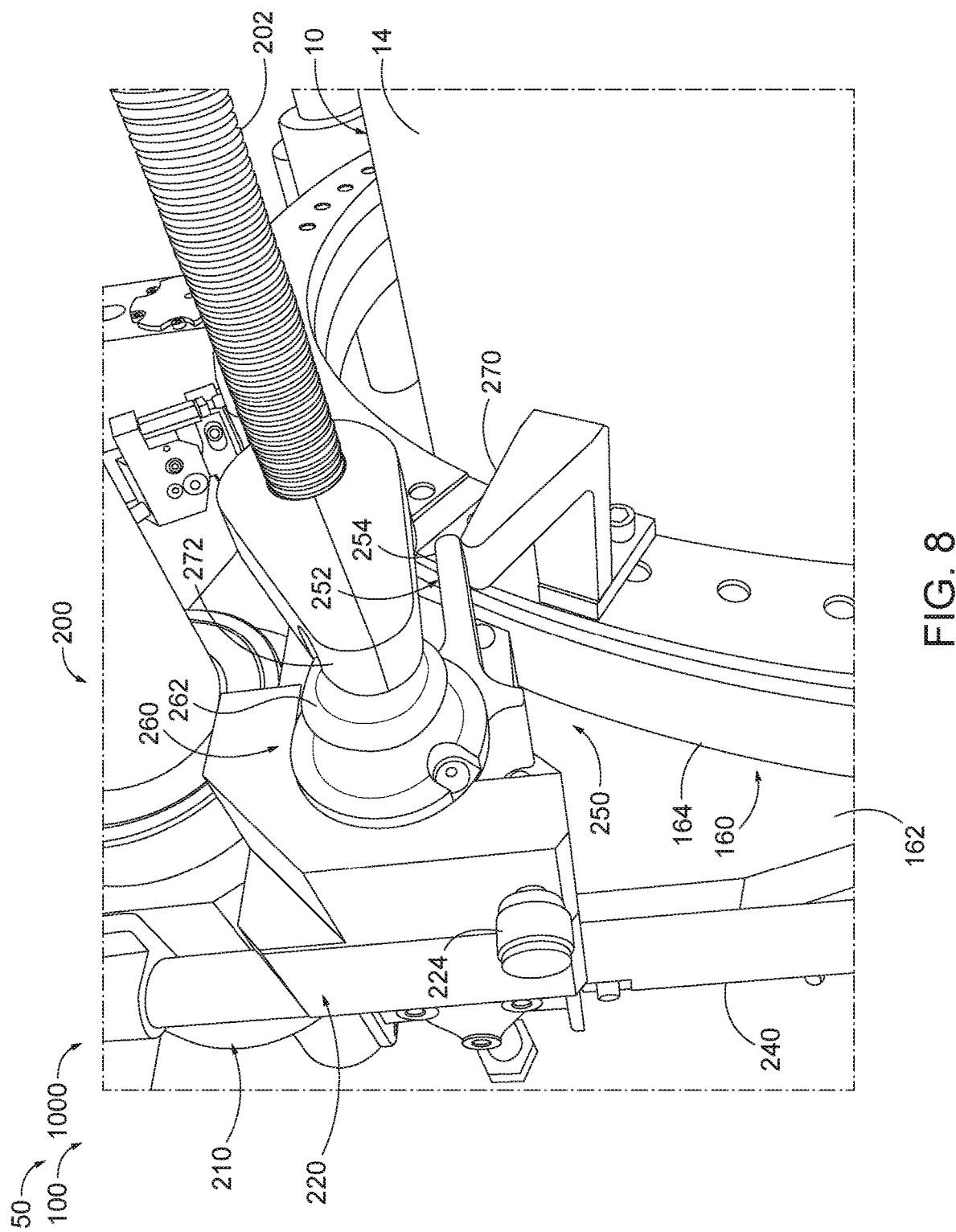
FIG. 8 is a rear bottom side perspective view of a portion of the example portable lathe of FIG. 2 with a feed tripper arm actuating a rotary feed element actuator, according to the present disclosure.
Figure 9:
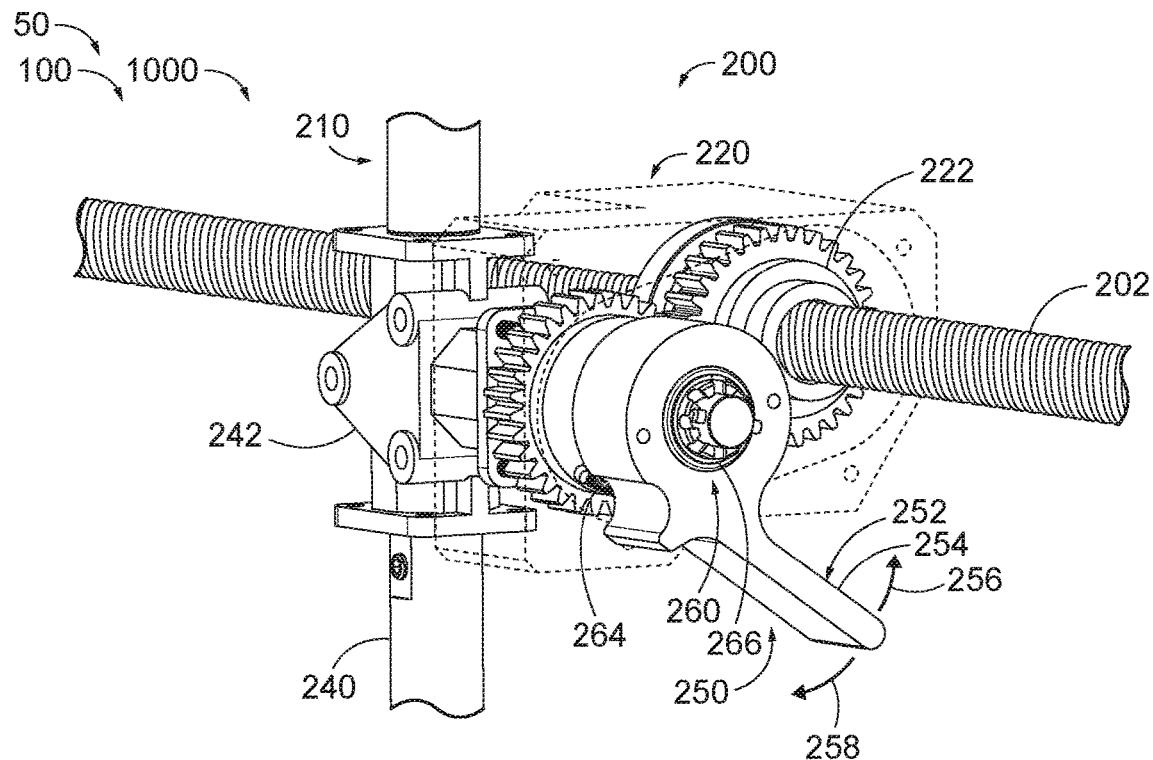
FIG. 9 is a rear top side isometric cutaway view of a driving gear assembly, according to the present disclosure, of the example portable lathe of FIG. 2.
Figure 10:
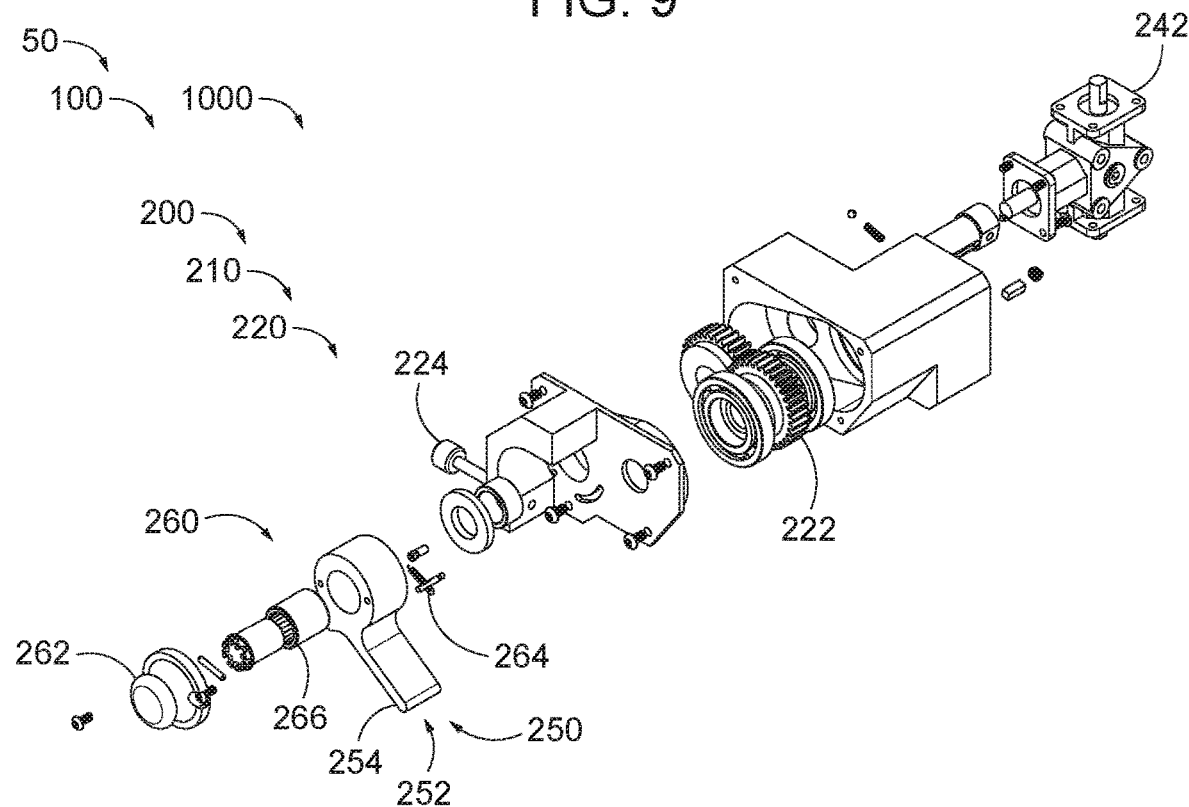
FIG. 10 is an exploded isometric view of the driving gear assembly of FIG. 9.

Feed assembly 200 may have any appropriate structure and/or functionality for translating tool assembly 160 along guide bars 150, examples of which are discussed below and shown in more detail in FIGS. 5-11. As described below, FIG. 5 illustrates aspects of feed assembly 200 and of tool assembly 160 of example portable lathe 1000, while FIGS. 6-7 illustrate portions of FIG. 5 in more detail. FIG. 8 illustrates an example of the operation of feed assembly 200 of example portable lathe 1000. FIG. 9 is an isometric view corresponding to FIG. 6 with selected components hidden for clarity. FIG. 10 is an exploded view of the structure depicted in FIGS. 6 and 9. FIG. 11 is an isometric view corresponding to FIG. 7 with selected components hidden for clarity.

Portable lathe 100 and/or feed assembly 200 may be configured to rotate driving rotary feed element 222 upon fixed linear feed element 202 in any appropriate manner. In some examples, and as shown in FIG. 1 and illustrated in FIGS. 5-10, feed assembly 200 includes a rotary feed element driving assembly 250 that is operatively coupled to driving rotary feed element 222 (shown in FIGS. 6 and 9-10) and that includes a rotary feed element actuator 252 (shown in FIGS. 5-6 and 8-10), and feed assembly 200 further includes a feed tripper arm 270 (shown in FIG. 1 and visible in FIGS. 5 and 8) for actuating rotary feed element actuator 252. In such examples, and as described herein, rotary feed element driving assembly 250 is configured to rotate driving rotary feed element 222 relative to fixed linear feed element 202 responsive to feed tripper arm 270 engaging and actuating rotary feed element actuator 252.

In some examples, such as in example portable lathe 1000 of FIGS. 2-16, feed tripper arm 270 is coupled to rotating portion 164 of tool assembly 160 such that rotation of rotating portion 164 causes feed tripper arm 270 to move past and engage rotary feed element actuator 252, thereby actuating rotary feed element actuator 252 to rotate driving rotary feed element 222 relative to fixed linear feed element 202. As a more specific example, FIG. 5 illustrates tool assembly 160 and feed assembly 200 in a configuration in which feed tripper arm 270 is spaced apart from rotary feed element actuator 252, while FIG. 8 illustrates a configuration in which rotating portion 164 of tool assembly 160 has rotated feed tripper arm 270 into pivotal engagement with rotary feed element actuator 252. Accordingly, FIG. 8 may be described as depicting feed assembly 200 in a state in which feed tripper arm 270 is moving past and actuating rotary feed element actuator 252. In FIGS. 5-8, example portable lathe 1000 is viewed along a direction in which rotating portion 164 rotates relative to non-rotating portion 162 in a clockwise direction.

As illustrated in FIGS. 6 and 8-9, rotary feed element actuator 252 of example portable lathe 1000 is rotationally coupled to driving rotary feed element 222 (shown in FIGS. 6 and 9) such that pivoting rotary feed element actuator 252 results in a rotation of driving rotary feed element 222 relative to fixed linear feed element 202. In this manner, each time feed tripper arm 270 moves past and actuates rotary feed element actuator 252, driving rotary feed element 222 rotates by a given rotational increment, such that tool assembly 160 translates along guide bars 150 by a step increment that corresponds to the rotational increment. As examples, the step increment may be at least 0.01 mm, at least 0.03 mm, at least 0.05 mm, at least 0.1 mm, at least 0.3 mm, at least 0.5 mm, at least 1 mm, at most 2 mm, at most 0.7 mm, at most 0.2 mm, at most 0.07 mm, and/or at most 0.02 mm. In some examples, and as additionally illustrated in FIGS. 5-6, feed assembly 200 includes a feed adjustment screw 224 for manually adjusting the step increment corresponding to a given rotational increment (i.e., the step increment produced upon each actuation of rotary feed element actuator 252).

FIGS. 9-10 illustrate components of rotary feed element driving assembly 250 of example portable lathe 1000 in more detail. In particular, FIG. 9 illustrates driving rotary feed element 222 operatively engaged with (i.e., threaded onto) fixed linear feed element 202 and rotary feed element driving assembly 250 for rotating driving rotary feed element 222, while FIG. 10 is an exploded view of a collection of components including driving rotary feed element 222 and rotary feed element driving assembly 250. In some examples, and as illustrated in FIGS. 9-10, rotary feed element driving assembly 250 includes a clutch mechanism 260 such that rotary feed element actuator 252 is rotationally coupled to driving rotary feed element 222 in only one rotational direction. For example, and as illustrated in FIGS. 9-10, rotary feed element actuator 252 may include and/or be a clutch arm 254 that is configured to pivot in a first direction 256 and in a second direction 258 that is opposite first direction 256 (these directions being shown in FIG. 9), such that driving rotary feed element 222 rotates relative to fixed linear feed element 202 only when clutch arm 254 pivots in first direction 256. More specifically, in such examples, when clutch arm 254 is pivoted in first direction 256, clutch mechanism 260 mechanically couples clutch arm 254 to driving rotary feed element 222 such that the pivoting of clutch arm 254 causes driving rotary feed element 222 to rotate relative to fixed linear feed element 202. Alternatively, when clutch arm 254 is pivoted in second direction 258, clutch mechanism 260 mechanically decouples clutch arm 254 from driving rotary feed element 222, and driving rotary feed element 222 remains at least substantially rotationally static as clutch arm 254 pivots in second direction 258.

In some examples, clutch arm 254 is biased to pivot in second direction 258. For example, and as illustrated in FIGS. 6 and 9-10, rotary feed element driving assembly 250 may include a clutch spring 264 that biases clutch arm 254 to pivot in second direction 258 (labeled in FIGS. 6 and 9). Accordingly, in such examples, after the rotation of rotating portion 164 causes feed tripper arm 270 to engage and pivot clutch arm 254 in first direction 256 to rotate driving rotary feed element 222 by the rotational increment, clutch arm 254 automatically pivots in second direction 258 back to a nominal position (e.g., the position illustrated in FIGS. 5-6 and 9) to be actuated once again by feed tripper arm 270 upon the next revolution of rotating portion 164. Clutch mechanism 260 may include and/or be any appropriate mechanism for selectively rotationally coupling clutch arm 254 and driving rotary feed element 222. As an example, and as shown in FIGS. 9-10, clutch mechanism 260 may include a roller clutch bearing 266.

In some examples, clutch mechanism 260 further includes a mechanism for selectively mechanically decoupling clutch arm 254 from driving rotary feed element 222 such that driving rotary feed element 222 remains rotationally static as clutch arm 254 pivots in either of first direction 256 or second direction 258. For example, and as illustrated at least in FIGS. 4 and 8, clutch mechanism 260 may include a clutch stop 262 operatively coupled to tool assembly 160, and feed assembly 200 may include a feed stop 272 that is at least substantially fixed relative to guide bars 150 and that is configured to engage clutch stop 262. More specifically, in such examples, clutch stop 262 and feed stop 272 are positioned such that the translation of tool assembly 160 along guide bars 150 eventually brings clutch stop 262 into engagement with feed stop 272. In such an event, feed stop 272 actuates clutch stop 262 such that clutch mechanism 260 mechanically decouples clutch arm 254 from driving rotary feed element 222 such that tool assembly 160 ceases to translate along guide bars 150 when feed tripper arm 270 actuates rotary feed element actuator 252. In this manner, a position of feed stop 272 relative to an initial position of tool assembly 160 effectively operates to limit a range of motion of tool assembly 160 during operative use of portable lathe 100. More specifically, and with reference to FIG. 4, feed stop 272 may at least partially define an axial range of motion 104 of tool assembly 160, as measured along a direction at least substantially parallel to rotation axis 102 and from an initial position (such as that illustrated in FIG. 4) to a final position (as defined by feed stop 272, such as that illustrated in FIG. 8). As more specific examples, feed assembly 200 may be configured to translate tool assembly 160 through axial ranges of motion 104 that are at least 30 cm, at least 50 cm, at least 100 cm, at least 130 cm, at least 150 cm, at least 200 cm, at least 220 cm, at most 170 cm, at most 120 cm, at most 70 cm, and/or at most 40 cm. In some examples, feed stop 272 is configured to be selectively positioned in a desired location relative to guide bars 150

(e.g., prior to initiating a machining operation) to selectively vary the location (relative to guide bars 150) at which tool assembly 160 ceases translation when feed stop 272 engages clutch stop 262. Additionally or alternatively, and as illustrated in FIGS. 2 and 8, feed stop 272 may be mounted on fixed linear feed element 202.

In some examples, feed assembly 200 additionally or alternatively may be configured to rotate driving rotary feed element 222 relative to fixed linear feed element 202 at least partially via a manual or motorized feed input. As an example, and as illustrated in FIGS. 4-5, feed assembly 200 may include a manual feed input 276 for manually rotating driving rotary feed element 222 relative to fixed linear feed element 202 to translate tool assembly 160 along guide bars 150. In this manner, manual feed input may be configured to rotate driving rotary feed element 222 while rotating portion 164 of tool assembly 160 remains fixed relative to non-rotating portion 162, such as prior to and/or subsequent to operative use of portable lathe 100 to machine cylindrical workpiece 10. Manual feed input 276 may be operatively coupled to driving rotary feed element 222 in any appropriate manner. As an example, manual feed input 276 may be mechanically and/or rotationally coupled to driving rotary feed element 222 such that manual feed input 276 and driving rotary feed element 222 rotate concurrently and/or at least substantially in unison. In some examples, and as shown in FIGS. 4-5, manual feed input 276 may include and/or be a knob and/or a wheel for manually rotating driving rotary feed element 222. Additionally or alternatively, and as schematically shown in FIG. 1, feed assembly 200 may include a feed motor 274 that is operatively coupled to driving rotary feed element 222 and that is configured to rotate driving rotary feed element 222 to urge tool assembly 160 to translate along guide bars 150. In such examples, feed motor 274 may include and/or be any appropriate motor, such as an electric motor, a pneumatic motor, and/or a hydraulic motor.

In some examples, the rotation of driving rotary feed element 222 relative to fixed linear feed element 202 may be sufficient to translate tool assembly 160 along guide bars 150. However, it also may be desirable that feed assembly 200 includes a plurality of fixed linear feed elements and rotating rotary feed elements that collectively urge tool assembly 160 with a corresponding plurality of forces exerted at spaced-apart locations. For example, and as shown in FIG. 1 and as illustrated in FIGS. 3-5, fixed linear feed element 202 may be a first fixed linear feed element 202, and feed assembly 200 additionally may include a second fixed linear feed element 204 and a driven rotary feed element 232 (visible in FIG. 5) operatively engaged with second fixed linear feed element 204. In some examples, second fixed linear feed element 204 extends between the pair of frame members 130 at least substantially parallel to first fixed linear feed element 202.

Second fixed linear feed element 204 and driven rotary feed element 232 may include any appropriate structures such that rotation of driven rotary feed element 232 relative to second fixed linear feed element 204 operates to translate tool assembly 160 along guide bars 150 during operative use of portable lathe 100. As an example, such as in the example of example portable lathe 1000, second fixed linear feed element 204 may be a fixed leadscrew (e.g., a ball screw), and driven rotary feed element 232 may be a driving nut (e.g., a ball screw nut) that is threaded onto the fixed leadscrew such that rotation of the driven nut relative to the second fixed leadscrew operates to urge the driven nut to translate along the second fixed leadscrew. As another example, second fixed linear feed element 204 may be a fixed gear rack, and driven rotary feed element 232 may be a pinion gear that engages the fixed gear rack such that rotation of the pinion gear relative to the fixed gear rack operates to urge the pinion gear to translate along the fixed gear rack. In some examples, such as in the example of example portable lathe 1000, first fixed linear feed element 202 and second fixed linear feed element 204 may have the same form (e.g., both may be fixed leadscrews), and driving rotary feed element 222 and driven rotary feed element 232 may have the same form (e.g., both may be geared nuts). However, this is not required, and it is additionally within the scope of the present disclosure that first fixed linear feed element 202 and second fixed linear feed element 204 may include different forms and/or structures, and/or that driving rotary feed element 222 and driven rotary feed element 232 have different forms and/or structures. As an example, first fixed linear feed element 202 may include and/or be a fixed leadscrew and second fixed linear feed element 204 may be a fixed gear rack (or vice-versa).

In examples of portable lathe 100 in which feed assembly 200 includes first fixed linear feed element 202 and second fixed linear feed element 204, feed assembly 200 is configured such that rotation of driven rotary feed element 232 relative to second fixed linear feed element 204 causes driven rotary feed element 232 to translate along second fixed linear feed element 204, thereby urging tool assembly 160 to translate along guide bars 150. In this manner, in such examples, the rotation of driving rotary feed element 222 relative to first fixed linear feed element 202 and the rotation of driven rotary feed element 232 relative to second fixed linear feed element 204 each operate to urge tool assembly 160 to translate along guide bars 150 via respective forces that are spaced apart. That is, configuring feed assembly 200 such that first fixed linear feed element 202 is spatially separated from second fixed linear feed element 204 produces a configuration in which tool assembly 160 receives a motive force for translating along guide bars 150 at two separate locations, thereby promoting smooth translation and reducing a likelihood of tool assembly 160 seizing upon guide bars 150 during operative use of portable lathe 100.

First fixed linear feed element 202 and second fixed linear feed element 204 may have any appropriate relative configuration, such as to promote a balance of the translational forces applied to tool assembly 160. For example, and as illustrated at least in FIG. 5, second fixed linear feed element 204 may be positioned on an opposite side of rotation axis 102 relative to first fixed linear feed element 202. As more specific examples, second fixed linear feed element 204 may be positioned 135°-225° from first fixed linear feed element 202 (as measured through a plane perpendicular to rotation axis 102), and optionally 170°-190° from first fixed linear feed element 202. In some examples, and as illustrated in FIG. 5, second fixed linear feed element 204 may be positioned at, or approximately at, 180° from first fixed linear feed element 202 about rotation axis 102.

In some examples, driving rotary feed element 222 and driven rotary feed element 232 are rotationally coupled to one another such that driven rotary feed element 232 rotates relative to second fixed linear feed element 204 responsive to driving rotary feed element 222 rotating relative to first fixed linear feed element 202. In some such examples, driving rotary feed element 222 and driven rotary feed element 232 have similar configurations (e.g., may be nuts with the same thread handedness and/or pitch), such that driving rotary feed element 222 and driven rotary feed element 232 rotate at least substantially in unison and/or in the same direction. However, this is not required, and it is additionally within the scope of the present disclosure that driving rotary feed element 222 and driven rotary feed element 232 may have different configurations, such as thread configurations that differ in thread handedness and/or pitch.

Driving rotary feed element 222 and driven rotary feed element 232 may be rotationally coupled to one another in any appropriate manner. In some examples, and as shown in FIG. 1 and perhaps best illustrated in FIG. 5, feed assembly 200 includes a drive train 210 that operatively couples driving rotary feed element 222 and driven rotary feed element 232 to one another such that driving rotary feed element 222 and driven rotary feed element 232 are rotationally coupled to one another. Drive train 210 may be configured such that driving rotary feed element 222 and driven rotary feed element 232 rotate concurrently and/or at least substantially in unison. For example, drive train 210 may be configured such that driving rotary feed element 222 and driven rotary feed element 232 rotate concurrently with respective rotational velocities that are at least substantially identical. In other examples, drive train 210 may be configured such that driving rotary feed element 222 and driven rotary feed element 232 rotate concurrently but with distinct rotational velocities.

Drive train 210 may have any appropriate structure and/or components for operatively coupling driving rotary feed element 222 to driven rotary feed element 232. In some examples, and as schematically shown in FIG. 1 and illustrated in FIGS. 5-7, drive train 210 includes a driving gear assembly 220 (shown in FIGS. 5-6) that includes driving rotary feed element 222, a driven gear assembly 230 (shown in FIGS. 5 and 7) that includes driven rotary feed element 232, and one or more drive shafts 240 that operatively and rotationally couple driving rotary feed element 222 and driven rotary feed element 232 to one another. In this manner, driving gear assembly 220 and driven gear assembly 230 each may be described as being operatively coupled to tool assembly 160 and as operating to urge tool assembly 160 to translate along guide bars 150 as a result of the rotation of driving rotary feed element 222 and the resulting rotation of driven rotary feed element 232. As illustrated in FIG. 5, each drive shaft 240 typically extends along a direction that is at least substantially linear. Accordingly, and as further illustrated in FIG. 5, an example of drive train 210 that includes two or more drive shafts 240 additionally may include one or more angle gear drives 242 for operatively coupling together two or more drive shafts 240 that extend along distinct directions. When present, each angle gear drive 242 may have any appropriate structure, such as one or more bevel gears.

FIG. 9 illustrates driving gear assembly 220 in more detail, while FIG. 10 may be described as an exploded view of driving gear assembly 220. In FIG. 9, an outline of a housing driving gear assembly 220 is illustrated in dashed lines to enhance visibility of components contained therein. As illustrated in FIGS. 9-10, driving gear assembly 220 of example portable lathe 1000 includes rotary feed element driving assembly 250 and clutch mechanism 260. Driving rotary feed element 222 and/or driven rotary feed element 232 each may have any appropriate structure for enabling and/or facilitating the rotational coupling therebetween via drive train 210. In some examples, and as shown in FIGS. 9-10, driving rotary feed element 222 is a geared driving nut 222 with a threaded internal structure for threaded engagement with first fixed linear feed element 202 in the form of a fixed leadscrew and with a geared external structure for rotational engagement with one or more other components of driving gear assembly 220. In such examples, driving gear assembly 220 is configured to transmit a torque from rotary feed element actuator 252 to geared driving rotary feed element 222 when feed tripper arm 270 actuates rotary feed element actuator 252.

FIG. 11 illustrates driven gear assembly 230 in more detail. In some examples, and as illustrated in FIG. 11, driven rotary feed element 232 is a geared driven nut 232 with a threaded internal structure for threaded engagement with second fixed linear feed element 204 in the form of a fixed leadscrew and with a geared external structure for rotational engagement with one or more other components of driven gear assembly 230. In some such examples, driven gear assembly 230 is configured to transmit a torque from the one or more drive shafts 240 to geared driving rotary feed element 222 when feed tripper arm 270 actuates rotary feed element actuator 252. While the present disclosure generally relates to examples in which each of driving rotary feed element 222 and driven rotary feed element 232 is a geared rotary feed element, this is not required, and it is additionally within the scope of the present disclosure that driving rotary feed element 222 and/or driven rotary feed element 232 may have any appropriate structure for receiving and/or conveying a rotary force.

Driving rotary feed element 222 and driven rotary feed element 232 also may have any appropriate internal structure for operative engagement with first fixed linear feed element 202 and second fixed linear feed element 204. As an example, one or both of first fixed linear feed element 202 and second fixed linear feed element 204 may be a leadscrew in the form of a ball screw, and one or both of driving rotary feed element 222 and driven rotary feed element 232 may be a nut in the form of a ball screw nut that is threaded onto the ball screw such that the ball screw engages the ball screw nut at least partially via a plurality of ball bearings. In other examples, driving rotary feed element 222 may be in direct engagement (e.g., direct threaded and/or geared engagement) with first fixed linear feed element 202, and/or driven rotary feed element 232 may be in direct engagement (e.g., direct threaded and/or geared engagement with second fixed linear feed element 204.

While the present disclosure generally relates to example portable lathe 1000 that includes two fixed linear feed elements and two respective rotating rotary feed elements, it is additionally within the scope of the present disclosure that portable lathe 100 may include more than two fixed linear feed elements and/or rotating rotary feed elements. For example, while not specifically illustrated, it is additionally within the scope of the present disclosure that feed assembly 200 may include one or more additional fixed linear feed elements (i.e., in addition to first fixed linear feed element 202 and second fixed linear feed element 204) extending between frame members 130 and at least substantially parallel to first fixed linear feed element 202. In such examples, feed assembly 200 additionally may include one or more additional rotary feed elements (i.e., in addition to driving rotary feed element 222 and driven rotary feed element 232), each of which operatively engages a respective fixed linear feed element of the one or more additional fixed linear feed elements. In such examples, feed assembly 200 may be configured such that rotation of each additional rotary feed element relative to the respective fixed linear feed element causes the rotary feed element to translate along the respective additional fixed linear feed element, thereby urging tool assembly 160 to translate along guide bars 150. As a more specific example, at least one of the one or more additional rotary feed elements may be an additional driving rotary feed element that rotates relative to the respective fixed linear feed element responsive to rotation of rotating portion 164 relative to non-rotating portion 162. Similarly, at least one of the one or more additional rotary feed elements may be an additional driven rotary feed element that rotates relative to the respective fixed linear feed element responsive to rotation of driving rotary feed element 222 and/or at least one additional driving rotary feed element.

As discussed, portable lathe 100 generally is configured to machine external surface 14 of cylindrical workpiece 10 during operative use thereof. As examples, portable lathe 100 may be configured to resurface and/or redimension external surface 14. Accordingly, in some examples, and as shown in FIG. 1 and illustrated at least in FIGS. 5 and 12-13, portable lathe 100 includes a cutting assembly 170 for machining external surface 14 of cylindrical workpiece 10. Specifically, cutting assembly 170 is supported by rotating portion 164 of tool assembly 160 such that the rotation of rotating portion 164 about rotation axis 102 operates to revolve cutting assembly 170 around rotation axis 102 and around cylindrical workpiece 10. In conjunction with the translation of tool assembly 160 along guide bars 150 by feed assembly 200, portable lathe 100 thus operates to move cutting assembly 170 across a generally cylindrical area of external surface 14.

Cutting assembly 170 may have any appropriate structure and/or components for machining external surface 14 of cylindrical workpiece 10. In some examples, and as illustrated in FIGS. 5 and 12-13, cutting assembly 170 includes a cutting assembly base 174 operatively coupled to rotating portion 164 of tool assembly 160 and a cutting tool mount 176 operatively coupled to cutting assembly base 174, with cutting tool mount 176 being configured to operatively receive a cutting tool 182 (illustrated in FIG. 13). Cutting tool 182 may include and/or be any appropriate tool for machining external surface 14 of cylindrical workpiece 10, examples of which include a blade, a chisel, and/or an abrasive medium, and which additionally or alternatively may be described as a turning tool.

In some examples, cutting assembly 170 is configured to enable selective positioning of cutting tool 182 relative to cutting assembly base 174 and/or relative to cylindrical workpiece 10. As an example, cutting assembly 170 may be configured such that cutting tool 182 may be selectively mounted to cutting tool mount 176 at any of a plurality of distinct mounting locations (such as to position cutting tool 182 closer to or farther away from external surface 14 of cylindrical workpiece 10). Additionally or alternatively, and as illustrated in FIGS. 5 and 12-13, cutting tool mount 176 may be configured to translate relative to cutting assembly base 174 along a cutting tool axis 172 (illustrated in FIG. 5) that is at least substantially perpendicular to rotation axis 102, such as to translate cutting tool 182 closer to or farther away from external surface 14 of cylindrical workpiece 10 (as shown in FIG. 13).

In some examples, cutting tool mount 176 is configured to translate relative to cutting assembly base 174 along cutting tool axis 172 responsive to rotating portion 164 of tool assembly 160 rotating relative to non-rotating portion 162 about rotation axis 102. As a more specific example, and as illustrated in FIGS. 5 and 12, cutting assembly 170 may include a star wheel 178 operatively coupled to cutting assembly base 174 and a tripper pin 180 (shown in FIG. 5) operatively coupled to non-rotating portion 162 of tool assembly 160. In such examples, cutting assembly 170 is configured such that, when cutting assembly 170 rotates past tripper pin 180 (due to rotating portion 164 rotating relative to non-rotating portion 162), tripper pin 180 rotates star wheel 178, thereby causing cutting tool mount 176 to translate relative to cutting assembly base 174 along cutting tool axis 172 and toward cylindrical workpiece 10. In this manner, in such examples, cutting assembly 170 may be described as being configured to automatically advance cutting tool 182 toward and/or into external surface 14 of cylindrical workpiece 10 during operative use of portable lathe 100.

In some examples, the automatic translation of cutting tool mount 176 along cutting tool axis 172 may be selectively enabled or disabled. For example, tripper pin 180 may be configured to be selectively transitioned between an activated configuration and a disabled configuration. Specifically, when tripper pin 180 is in the activated configuration, tripper pin 180 is positioned to engage and rotate star wheel 178 when cutting assembly base 174 moves past tripper pin 180 as rotating portion 164 rotates relative to non-rotating portion 162. When tripper pin 180 is in the disabled configuration, tripper pin 180 is positioned to be spaced apart from star wheel 178 when cutting assembly base 174 moves past tripper pin 180. Accordingly, when tripper pin 180 is in the activated configuration and when portable lathe 100 is operatively installed on cylindrical workpiece 10, cutting tool mount 176 automatically advances toward cylindrical workpiece 10 when rotating portion 164 rotates relative to non-rotating portion 162 to move tripper pin 180 across star wheel 178. In some such examples, tripper pin 180 is transitioned from the activated configuration to the disabled configuration when cutting tool 182 reaches a desired cutting depth relative to cylindrical workpiece 10.

Tripper pin 180 may be configured to be transitioned between the activated configuration and the disabled configuration in any appropriate manner, such as via manual and/or remote control. In some examples, cutting assembly 170 includes a plurality of tripper pins 180 that are distributed around a circumference of non-rotating portion 162 of tool assembly 160. In such examples, each of the plurality of tripper pins 180 may be configured to be selectively and independently transitioned between the activated configuration and the disabled configuration. In this manner, a tool feed rate at which cutting tool mount 176 translates along cutting tool axis 172 (e.g., per unit time and/or per revolution of rotating portion 164) may be selectively varied via selective variation of the number of tripper pins 180 that are in the activated configuration. Additional aspects and examples of cutting assemblies including star wheels and tripper pins are disclosed in U.S. Pat. No. 8,250,953, the complete disclosure of which is hereby incorporated by reference.

Tool assembly 160 may include any appropriate structure and/or mechanism to generate and/or facilitate the rotation of rotating portion 164 relative to non-rotating portion 162. For example, and as shown in FIG. 1 and illustrated in FIGS. 2-5 and 14-15, portable lathe 100 may include a rotation motor 194 that is operatively coupled to tool assembly 160 and that is configured to rotate rotating portion 164 relative to non-rotating portion 162. In some examples, rotation motor 194 is fixedly coupled to non-rotating portion 162. Rotation motor 194 may include and/or be any appropriate motor, such as an electric motor, a pneumatic motor, and/or a hydraulic motor.

Figure 14:
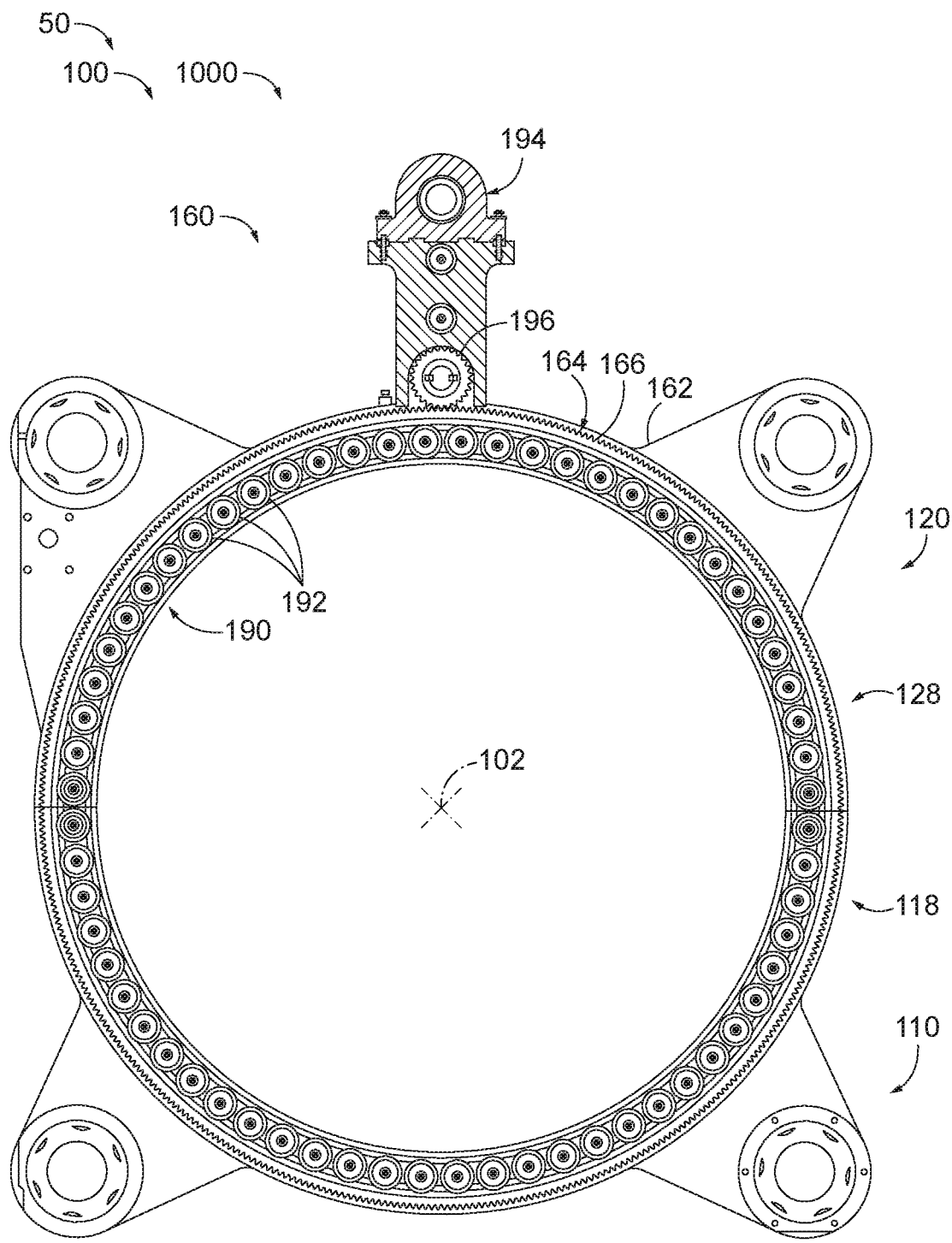
FIG. 14 is a rear elevation cutaway view of a portion of the example portable lathe of FIG. 2.

FIG. 14 is a cross-sectional illustration of a rotary mechanism that operatively connects non-rotating portion 162 and rotating portion 164 of example portable lathe 1000. As illustrated in FIG. 14, rotating portion 164 may include a ring gear 166, and rotation motor 194 may include a pinion gear 196 that engages ring gear 166 to rotate rotating portion 164 relative to non-rotating portion 162. Additionally or alternatively, and as further shown in FIG. 14, tool assembly 160 may include a roller assembly 190 with a plurality of rollers 192 that operatively couples rotating portion 164 to non-rotating portion 162 and that enables rotating portion 164 to rotate relative to non-rotating portion 162 about rotation axis 102. Additional aspects and examples of rotation motors including pinion gears are disclosed in U.S. Pat. No. 7,690,283, the complete disclosure of which is hereby incorporated by reference. The foregoing discussion generally relates to examples and instances in which portable lathe 100 is operatively installed on cylindrical workpiece 10. Stated differently, the above descriptions generally correspond to configurations in which portable lathe 100 has been operatively installed on cylindrical workpiece 10 such that portable lathe 100 is positioned and operative to machine external surface 14 of cylindrical workpiece 10. Accordingly, the above discussion generally relates to structures and mechanisms of portable lathe 100 corresponding to the functionality of machining external surface 14 of cylindrical workpiece 10. However, and as discussed, portable lathe 100 further may include structures and/or mechanisms corresponding to the portable nature of portable lathe 100, such as structures and/or mechanisms that facilitate operatively installing and/or assembling portable lathe 100 on cylindrical workpiece 10. Stated differently, portable lathe 100 may include one or more structures and/or features configured to facilitate transporting portable lathe 100 to a location of cylindrical workpiece 10 and/or to facilitate assembly and/or installation of portable lathe 100 by an end user. In this manner, and as shown in FIGS. 1-16, portable lathe 100 also may be described as being a portion of, and/or an assembled version of, a portable lathe assembly kit 50 that includes the components of portable lathe 100. Stated differently, the present disclosure also may be described as being directed to portable lathe assembly kits 50 that include at least a portion of portable lathe 100 and/or that facilitate operative installation and/or use of portable lathe 100 in conjunction with cylindrical workpiece 10.

In some examples, one or more components of portable lathe 100 each may include a plurality of portions that are configured to be operatively assembled around cylindrical workpiece 10. FIG. 15 is an exploded view that illustrates a manner in which example portable lathe 1000 may be installed upon and/or removed from cylindrical workpiece 10. As illustrated in FIGS. 2-4 and 15, each frame member 130 may include a first frame clamshell portion 112 and a second frame clamshell portion 122 that are operatively coupled to one another when portable lathe 100 is operatively installed on cylindrical workpiece 10. In such examples, first frame clamshell portion 112 and second frame clamshell portion 122 may be configured to be selectively and repeatedly coupled to one another and removed from one another. As a more specific example, and as illustrated at least in FIGS. 2-4, each frame member 130 may include a frame clamshell coupling structure 131 for selectively and operatively coupling first frame clamshell portion 112 and second frame clamshell portion 122 to one another. Frame clamshell coupling structure 131 may include and/or be any appropriate structure and/or mechanism, such as a swing bolt and/or a flange rotary feed element.

As another example, and as illustrated in FIGS. 2-5 and 15, tool assembly 160 may include a first tool assembly clamshell portion 118 and a second tool assembly clamshell portion 128 that are operatively coupled to one another when portable lathe 100 is operatively installed on cylindrical workpiece 10. In such examples, each of first tool assembly clamshell portion 118 and second tool assembly clamshell portion 128 may include at least a portion of each of non-rotating portion 162, rotating portion 164, ring gear 166, and/or roller assembly 190. In such examples, first tool assembly clamshell portion 118 and second tool assembly clamshell portion 128 may be configured to be selectively and repeatedly coupled to one another and removed from one another. As a more specific example, and as illustrated at least in FIGS. 2-5, tool assembly 160 may include a tool assembly clamshell coupling structure 161 for selectively and operatively coupling first tool assembly clamshell portion 118 and second tool assembly clamshell portion 128 to one another. Tool assembly clamshell coupling structure 161 may include and/or be any appropriate structure and/or mechanism, such as a swing bolt and/or a flange rotary feed element.

Each frame member 130 may be configured to operatively engage cylindrical workpiece 10 in any appropriate manner. As an example, and as illustrated at least in FIG. 15, each frame member 130 may include a workpiece engagement structure 136 for selectively and operatively engaging cylindrical workpiece 10 (such as external surface 14 thereof) when portable lathe 100 is operatively installed on cylindrical workpiece 10. In this manner, during operative use of portable lathe 100, workpiece engagement structure 136 may be described as operatively supporting each frame member 130 upon cylindrical workpiece 10.

As a more specific example, and as illustrated at least in FIG. 15, workpiece engagement structure 136 includes a clamp ring 138 and a plurality of locator pads 140 operatively coupled to clamp ring 138, with each locator pad 140 being configured to engage cylindrical workpiece 10 when portable lathe 100 is operatively installed on cylindrical workpiece 10. In some such examples, each locator pad 140 is configured to be selectively translated radially toward and away from rotation axis 102 to align cylindrical workpiece 10 within frame members 130. For example, each locator pad 140 may be selectively positioned in such a manner that workpiece longitudinal axis 12 is aligned with (e.g., at least substantially parallel to and/or collinear with) rotation axis 102. Clamp ring 138 may be integrally formed with frame member 130, or may be configured to be selectively and operatively coupled to frame member 130. Additional aspects and examples of portable lathes exhibiting clamshell constructions and configurations are disclosed in U.S. Pat. No. 8,584,557, the complete disclosure of which is hereby incorporated by reference.

In some examples, and as schematically shown in FIG. 1 and perhaps best illustrated in FIG. 15, portable lathe assembly kit 50 may be a partially assembled portable lathe assembly kit 50 that includes a first lathe clamshell subassembly 110 and a second lathe clamshell subassembly 120 that are configured to be operatively coupled to one another to operatively install portable lathe 100 on cylindrical workpiece 10. In such examples, and as illustrated in FIG. 15, first lathe clamshell subassembly 110 may include first frame clamshell portion 112 of each frame member 130 operatively coupled to one another by a first subset of the plurality of guide bars 150, as well as first tool assembly clamshell portion 118 operatively coupled to the first subset of the plurality of guide bars 150. Similarly, in such examples, and as further illustrated in FIG. 15, second lathe clamshell subassembly 120 may include second frame clamshell portion 122 of each frame member 130 operatively coupled to one another by a second subset of the plurality of guide bars 150, as well as second tool assembly clamshell portion 128 operatively coupled to the second subset of the plurality of guide bars 150. In some examples, and as further illustrated in FIG. 15, first lathe clamshell subassembly 110 includes second fixed linear feed element 204 and second lathe clamshell subassembly 120 includes first fixed linear feed element 202. However, it is additionally within the scope of the present disclosure that first lathe clamshell subassembly 110 includes first fixed linear feed element 202 and that second lathe clamshell subassembly 120 includes second fixed linear feed element 204.

FIG. 16 illustrates example portable lathe 1000 operatively installed on cylindrical workpiece 10. As illustrated in FIG. 16, portable lathe 100 may include one or more structures in addition to workpiece engagement structure 136 for securing cylindrical workpiece 10 relative to portable lathe 100. Specifically, as illustrated in FIG. 16, portable lathe 100 and/or portable lathe assembly kit 50 may include one or more holding tethers 60 for at least partially securing cylindrical workpiece 10 relative to each frame member 130. As a more specific example, and as illustrated in FIG. 16, when cylindrical workpiece 10 extends at least substantially horizontally, holding tethers 60 may be configured to supplement a force of gravity to maintain cylindrical workpiece 10 in a desired position relative to frame members 130, and/or otherwise to restrict frame members 130 from shifting relative to cylindrical workpiece 10 (or vice versa). As discussed in more detail below in the context of methods 300, holding tethers 60 additionally or alternatively may facilitate installation of portable lathe 100 on cylindrical workpiece 10, such as when cylindrical workpiece 10 does not extend horizontally.

As illustrated in FIG. 16, first frame clamshell portion 112 of each frame member 130 may include a pair of holding tether attachment points 114 (one of which is visible on each first frame clamshell portion 112 in FIG. 16). As shown in FIG. 16, each holding tether attachment point 114 is configured to be selectively and operatively coupled to a corresponding holding tether 60 for securing cylindrical workpiece 10 to first frame clamshell portion 112. As described in more detail below, such a configuration may facilitate installation of portable lathe 100 on cylindrical workpiece 10, and/or may assist in securing cylindrical workpiece 10 relative to portable lathe 100 during operative use of portable lathe 100 to machine cylindrical workpiece 10. In some such examples, and as further illustrated in FIG. 16, each holding tether attachment point 114 includes a tension adjustment mechanism 116 that is configured to enable adjustment of a tension of holding tether 60 around cylindrical workpiece 10, such as during assembly, installation, and/or operative use of portable lathe 100 on cylindrical workpiece 10. In such examples, tension adjustment mechanism 116 may include and/or be any appropriate mechanism and/or structure, examples of which include a turnbuckle, a threaded screw, an over-center tensioning lever, etc.

In some examples, and as discussed, portable lathe 100 may be configured to be controlled at least partially remotely during operative use to machine cylindrical workpiece 10. As a more specific example, and as shown in FIG. 1 and illustrated in FIG. 16, portable lathe 100 additionally may include an operator pendant 90 that is configured to enable remote control of at least a portion of portable lathe 100. More specifically, in such examples, operator pendant 90 is configured to receive a manual input from a human user and to transmit a control signal to one or more other components of portable lathe 100 based, at least in part, on the manual input. As an example, the control signal may be configured to control rotation motor 194 to initiate and/or cease rotation of rotating portion 164 of tool assembly 160 relative to non-rotating portion 162, and/or to control a rotational velocity with which rotating portion 164 rotates about rotation axis 102. As additional examples, the control signal may be configured to operate feed motor 274 to rotate driving rotary feed element 222 relative to first fixed linear feed element 202, and/or to selectively transition tripper pin 180 between the activated configuration and the disabled configuration. In this manner, operator pendant 90 may enable remote control of portable lathe 100 such that an operator need not approach the moving components of portable lathe 100 during operative use thereof.

Figure 17:
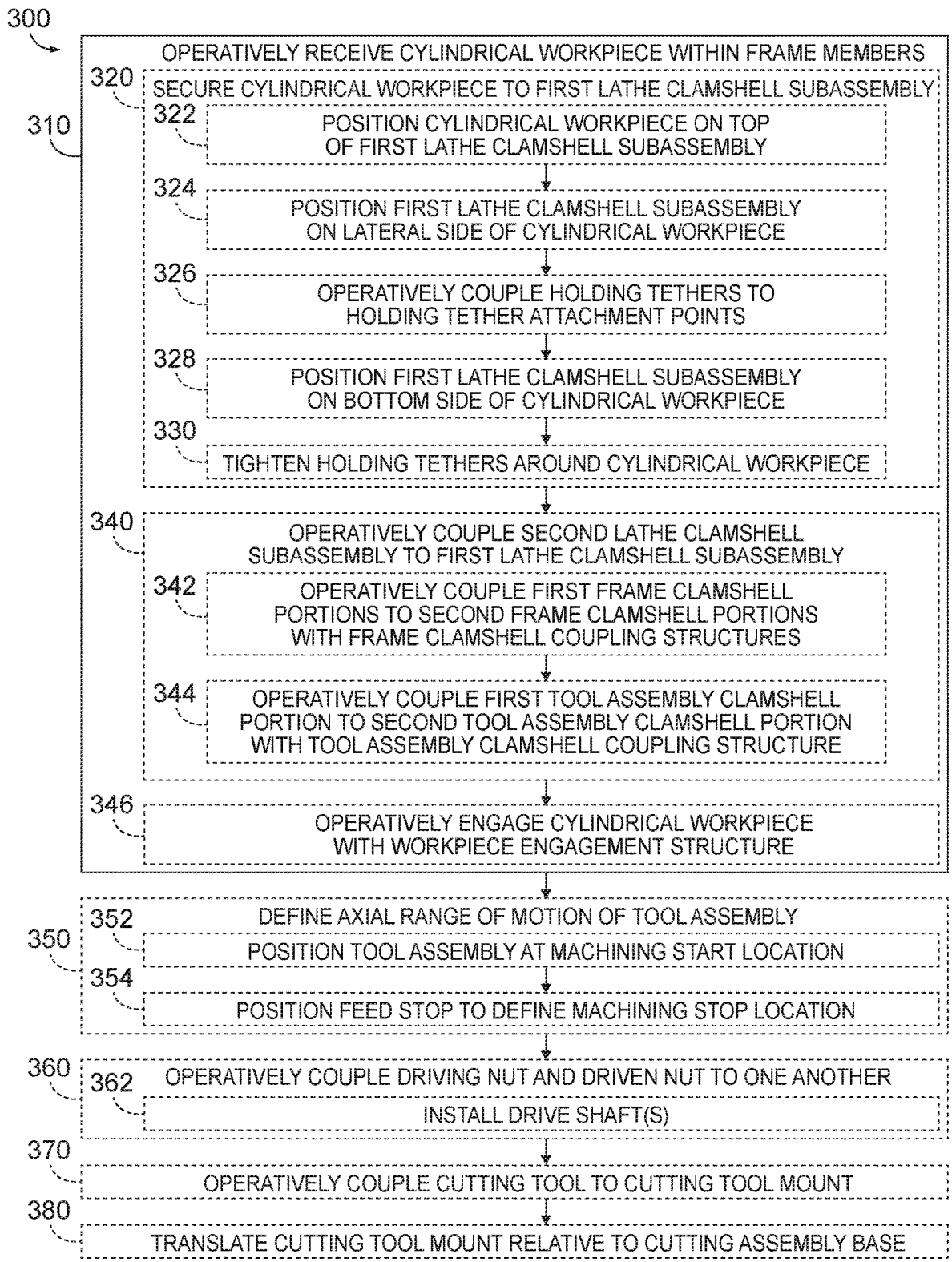
FIG. 17 is a flowchart depicting methods, according to the present disclosure, of utilizing a portable lathe assembly kit.

FIG. 17 is a flowchart depicting methods 300, according to the present disclosure, of utilizing a portable lathe assembly kit (such as portable lathe assembly kit 50) to operatively install a portable lathe (such as portable lathe 100 and/or example portable lathe 1000) on a cylindrical workpiece (such as cylindrical workpiece 10). As shown in FIG. 17, methods 300 include operatively receiving, at 310, the cylindrical workpiece within frame members (such as frame members 130) of the portable lathe assembly kit, and further may include one or more steps for preparing the portable lathe for operative use.

The operatively receiving the cylindrical workpiece with the frame members at 310 may be performed in any appropriate manner. As discussed, in some examples, the portable lathe assembly kit is a partially assembled portable lathe assembly kit that includes a first lathe clamshell subassembly (such as first lathe clamshell subassembly 110) and a second lathe clamshell subassembly (such as second lathe clamshell subassembly 120). In such examples, and as shown in FIG. 17, the operatively receiving the cylindrical workpiece within the frame members at 310 may include securing, at 320, the cylindrical workpiece to the first lathe clamshell subassembly and operatively coupling, at 340, the second lathe clamshell subassembly to the first lathe clamshell subassembly to assemble the portable lathe around the cylindrical workpiece. In some examples, the operatively coupling the second lathe clamshell subassembly to the first lathe clamshell subassembly at 340 is performed subsequent to the securing the cylindrical workpiece to the first lathe clamshell subassembly at 320.

In some examples, and as further shown in FIG. 17, the operatively receiving the cylindrical workpiece within the frame members at 310 includes operatively engaging, at 346, the cylindrical workpiece with a workpiece engagement structure (such as workpiece engagement structure 136) of each frame member. In this manner, and as described herein, the operatively receiving the cylindrical workpiece within the frame members at 310 may include aligning the cylindrical workpiece relative to the frame members such that a workpiece longitudinal axis of the cylindrical workpiece (such as workpiece longitudinal axis 12) is at least substantially parallel and/or collinear with a rotation axis (such as rotation axis 102) of the portable lathe.

The securing the cylindrical workpiece to the first lathe clamshell subassembly at 320 may be performed in any appropriate manner. In some examples, the first lathe clamshell subassembly and/or the cylindrical workpiece may be sufficiently heavy to render manual manipulation of such components impractical. Accordingly, it may be desirable to secure the cylindrical workpiece to the first lathe clamshell subassembly prior to completing assembly of the portable lathe around the cylindrical workpiece. In some examples, and as shown in FIG. 17, the portable lathe assembly kit is configured to be utilized in conjunction with a pair of holding tethers (such as holding tethers 60), and the securing the cylindrical workpiece to the first lathe clamshell subassembly at 320 includes operatively coupling, at 326, each holding tether to a pair of holding tether attachment points (such as holding tether attachment points 114 of first frame clamshell portion 112) such that the cylindrical workpiece extends between each holding tether and the respective frame member. Accordingly, in such examples, the pair of holding tethers may described as securing the cylindrical workpiece to the first lathe clamshell subassembly, such as to restrict and/or prevent the cylindrical workpiece from translating and/or rotating relative to each first frame clamshell portion. In some such examples, and as further shown in FIG. 17, the securing the cylindrical workpiece to the first lathe clamshell subassembly additionally includes tightening, at 330, each holding tether around the cylindrical workpiece such as with a tension adjustment mechanism (such as tension adjustment mechanism 116) associated with and/or included in a holding tether attachment point. As a more specific example, the tightening each holding tether at 330 may include tightening such that the cylindrical workpiece is held against the first lathe clamshell subassembly with sufficient tension that the first lathe clamshell subassembly does not move and/or shift relative to the cylindrical workpiece, even when the cylindrical workpiece is not perfectly horizontal.

In some examples, and as shown in FIG. 17, the securing the cylindrical workpiece to the first lathe clamshell subassembly at 320 includes, prior to the operatively coupling each holding tether to the pair of holding tether attachment points at 326, positioning, at 322, the cylindrical workpiece on top of the first lathe clamshell subassembly. For example, the positioning the cylindrical workpiece on top of the first lathe clamshell subassembly at 322 may include lifting the cylindrical workpiece (such as with a forklift) and placing the cylindrical workpiece on the first lathe clamshell subassembly.

In other examples, the securing the cylindrical workpiece to the first lathe clamshell subassembly at 320 may include pivoting the first lathe clamshell subassembly relative to the cylindrical workpiece. For example, the cylindrical workpiece may be more massive and/or difficult to manipulate relative to the first lathe clamshell subassembly, such that it is more practical to bring the first lathe clamshell subassembly into position relative to a substantially stationary cylindrical workpiece than to manipulate the cylindrical workpiece onto the first lathe clamshell subassembly.

As a more specific example, and as shown in FIG. 17, the securing the cylindrical workpiece to the first lathe clamshell subassembly at 320 may include, prior to the operatively coupling each holding tether to the pair of holding tether attachment points at 326, positioning, at 324, the first lathe clamshell subassembly at least substantially on a lateral side of the cylindrical workpiece. In such examples, the securing the cylindrical workpiece to the first lathe clamshell subassembly at 320 further includes, subsequent to the operatively coupling each holding tether to the pair of holding tether attachment points at 326, positioning, at 328, the first lathe clamshell subassembly at least substantially on a bottom side of the cylindrical workpiece. Stated differently, such examples may include securing the holding tethers around the cylindrical workpiece while the first lathe clamshell subassembly is held aloft on a lateral side of the cylindrical workpiece and subsequently pivoting the first lathe clamshell subassembly relative to the cylindrical workpiece (such as by lowering the first lathe clamshell subassembly while the holding tethers are wrapped around the cylindrical workpiece) such that the first lathe clamshell subassembly is at least partially supported by the cylindrical workpiece via the holding tethers.

The operatively coupling the second lathe clamshell subassembly to the first lathe clamshell subassembly at 340 may be performed in any appropriate manner and/or with any appropriate structures disclosed herein. As an example, and as shown in FIG. 17, the operatively coupling the second lathe clamshell subassembly to the first lathe clamshell subassembly at 340 may include operatively coupling, at 342, a first frame clamshell portion (such as first frame clamshell portion 112) of each frame member to a second frame clamshell portion (such as second frame clamshell portion 122) with a respective frame clamshell coupling structure (such as frame clamshell coupling structure 131). Additionally or alternatively, and as further shown in FIG. 17, the operatively coupling the second lathe clamshell subassembly to the first lathe clamshell subassembly at 340 may include operatively coupling, at 344, a first tool assembly clamshell portion (such as first tool assembly clamshell portion 118) to a second tool assembly clamshell portion (such as second tool assembly clamshell portion 128) with a respective tool assembly clamshell coupling structure (such as tool assembly clamshell coupling structure 161).

In some examples, methods 300 additionally include one or more steps for initializing and/or preparing the portable lathe for operative use to machine the cylindrical workpiece. As an example, and as shown in FIG. 17, methods 300 may include defining, at 350, an axial range of motion (such as axial range of motion 104) of a tool assembly (such as tool assembly 160) of the portable lathe. As a more specific example, and as further shown in FIG. 17, the defining the axial range of motion of the tool assembly at 350 may include positioning, at 352, the tool assembly along a plurality of guide bars (such as guide bars 150) at a machining start location at which the machining operation is to be initiated. In some such examples, the positioning the tool assembly along the plurality of guide bars at 352 includes translating the tool assembly along the plurality of guide bars with a manual feed input (such as manual feed input 276). Additionally or alternatively, and as further shown in FIG. 17, the defining the axial range of motion of the tool assembly at 350 may include positioning, at 354, a feed stop (such as feed stop 272) relative to the plurality of guide bars at a location corresponding to a machining stop location at which the machining operation is to be automatically ceased.

In some examples, and as discussed, the portable lathe includes a feed assembly (such as feed assembly 200) that includes a driving rotary feed element (such as driving rotary feed element 222) operatively engaged with a first fixed linear feed element (such as first fixed linear feed element 202) as well as a driven rotary feed element (such as driven rotary feed element 232) operatively engaged with a second fixed linear feed element (such as second fixed linear feed element 204) such that the driving rotary feed element and the driven rotary feed element are rotationally coupled to one another during operative use of the portable lathe. Accordingly, and as shown in FIG. 17, method 300 additionally may include operatively coupling, at 360, the driving rotary feed element and the driven rotary feed element to one another such that the driving rotary feed element and the driven rotary feed element are rotationally coupled together.

As an example, the portable lathe assembly kit may include a drive train (such as drive train 210) configured to operatively couple the driving rotary feed element and the driven rotary feed element to one another, with the drive train including a driving gear assembly (such as driving gear assembly 220), a driven gear assembly (such as driven gear assembly 230), and one or more drive shafts (such as drive shafts 240) for operatively coupling the driving gear assembly and the driven gear assembly to one another, as described herein. In such examples, and as shown in FIG. 17, the operatively coupling the driving rotary feed element and the driven rotary feed element to one another at 360 may include installing, at 362, the one or more drive shafts to extend between the driving gear assembly and the driven gear assembly. In some such examples, the one or more drive shafts include a plurality of drive shafts that extend along distinct directions (such as distinct linear directions), such that the installing the one or more drive shafts at 362 includes operatively coupling a first drive shaft and a second drive shaft to one another with an angle gear drive (such as angle gear drive 242) such that the first drive shaft and the second drive shaft extend along distinct directions.

In some examples, methods 300 additionally include one or more steps for preparing a cutting assembly (such as cutting assembly 170) for operative use to machine the cylindrical workpiece. For example, and as discussed, the cutting assembly may include a cutting assembly base (such as cutting assembly base 174) operatively coupled to a rotating portion (such as rotating portion 164) of the tool assembly and a cutting tool mount (such as cutting tool mount 176) operatively coupled to the cutting assembly base and configured to support a cutting tool (such as cutting tool 182). In such examples, and as further shown in FIG. 17, methods 300 may include operatively coupling, at 370, the cutting tool to the cutting tool mount (such as at a selected mounting location of a plurality of distinct mounting locations) and/or translating, at 380, the cutting tool mount relative to the cutting assembly base along a cutting tool axis (such as cutting tool axis 172) to position the cutting tool relative to the cylindrical workpiece. As a more specific example, the operatively coupling the cutting tool to the cutting tool mount at 370 and/or the translating the cutting tool mount relative to the cutting assembly base at 380 may include positioning the cutting tool at or near an external surface (such as external surface 14) of the cylindrical workpiece.

Illustrative, non-exclusive examples of portable lathes, portable lathe assembly kits, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A portable lathe for machining an external surface of a cylindrical workpiece having a workpiece longitudinal axis, the portable lathe comprising:
two spaced-apart frame members configured to operatively support the portable lathe on the cylindrical workpiece such that the workpiece longitudinal axis is at least substantially parallel to a rotation axis of the portable lathe when the portable lathe is operatively installed on the cylindrical workpiece;
a plurality of guide bars extending between and operatively coupling the frame members to one another, each guide bar of the plurality of guide bars extending along a direction at least substantially parallel to the rotation axis;
a tool assembly supported by the plurality of guide bars and comprising a non-rotating portion and a rotating portion configured to rotate relative to the non-rotating portion about the rotation axis;
wherein the tool assembly is configured to translate along the plurality of guide bars and along a direction at least substantially parallel to the rotation axis; and
a feed assembly operatively coupled to the tool assembly and configured to translate the tool assembly along the plurality of guide bars;
wherein the feed assembly comprises:
a fixed linear feed element extending between the frame members; and
a driving rotary feed element operatively engaged with the fixed linear feed element and operatively coupled to the tool assembly; and
wherein the feed assembly is configured such that rotation of the driving rotary feed element relative to the fixed linear feed element causes the driving rotary feed element to translate along the fixed linear feed element, thereby urging the tool assembly to translate along the plurality of guide bars.

A2. The portable lathe of paragraph A1, wherein the rotation axis is at least substantially collinear with the workpiece longitudinal axis when the portable lathe is operatively installed on the cylindrical workpiece.

A3. The portable lathe of any of paragraphs A1-A2, wherein the fixed linear feed element is operatively coupled to the frame members such that the fixed linear feed element is restricted from rotating relative to the frame members.

A4. The portable lathe of any of paragraphs A1-A3, wherein the fixed linear feed element extends at least partially through each of the frame members.

A5. The portable lathe of any of paragraphs A1-A4, wherein the fixed linear feed element is spaced apart from the rotation axis.

A6. The portable lathe of any of paragraphs A1-A5, wherein the portable lathe is configured such that the driving rotary feed element rotates relative to the fixed linear feed element responsive to rotation of the rotating portion of the tool assembly relative to the non-rotating portion of the tool assembly.

A7. The portable lathe of any of paragraphs A1-A6, wherein the feed assembly further comprises:
a rotary feed element driving assembly operatively coupled to the driving rotary feed element and including a rotary feed element actuator; and
a feed tripper arm coupled to the rotating portion of the tool assembly;
wherein the rotary feed element driving assembly is configured to rotate the driving rotary feed element relative to the fixed linear feed element responsive to the feed tripper arm engaging and actuating the rotary feed element actuator.

A8. The portable lathe of paragraph A7, wherein the feed assembly is configured such that rotation of the rotating portion of the tool assembly relative to the non-rotating portion of the tool assembly causes the feed tripper arm to move past and engage the rotary feed element actuator, thereby actuating the rotary feed element actuator to rotate the driving rotary feed element relative to the fixed linear feed element.

A9. The portable lathe of any of paragraphs A7-A8, wherein the feed assembly is configured such that, each time the feed tripper arm moves past and actuates the rotary feed element actuator, the tool assembly translates along the plurality of guide bars by a step increment.

A10. The portable lathe of paragraph A9, wherein the step increment is one or more of at least 0.01 mm, at least 0.03 mm, at least 0.05 mm, at least 0.1 mm, at least 0.3 mm, at least 0.5 mm, at least 1 mm, at most 2 mm, at most 0.7 mm, at most 0.2 mm, at most 0.07 mm, and at most 0.02 mm.

A11. The portable lathe of any of paragraphs A9-A10, wherein the feed assembly further comprises a feed adjustment screw for manually adjusting the step increment.

A12. The portable lathe of any of paragraphs A7-A11, wherein the rotary feed element driving assembly comprises a clutch mechanism; wherein the rotary feed element actuator comprises a clutch arm that is configured to pivot in a first direction and in a second direction that is opposite the first direction;
  wherein, when the clutch arm is pivoted in the first direction, the clutch mechanism mechanically couples the clutch arm to the driving rotary feed element such that pivoting of the clutch arm causes the driving rotary feed element to rotate relative to the fixed linear feed element; and
  wherein, when the clutch arm is pivoted in the second direction, the clutch mechanism mechanically decouples the clutch arm from the driving rotary feed element.

A13. The portable lathe of paragraph AU, wherein the clutch arm is biased to pivot in the second direction.

A14. The portable lathe of any of paragraphs A12-A13, wherein the rotary feed element driving assembly further comprises a clutch spring that biases the clutch arm in the second direction.

A15. The portable lathe of any of paragraphs A12-A14, wherein the clutch mechanism comprises a roller clutch bearing.

A16. The portable lathe of any of paragraphs A12-A15, wherein the clutch mechanism comprises a clutch stop that is operatively coupled to the tool assembly; wherein the feed assembly further comprises a feed stop that is at least substantially fixed relative to the guide bars during operative use of the portable lathe and that is positioned to engage the clutch stop as the tool assembly translates along the plurality of guide bars; and wherein the feed assembly is configured such that, when the feed stop engages the clutch stop, the feed stop actuates the clutch stop such that the clutch mechanism mechanically decouples the clutch arm from the driving rotary feed element to cease translation of the tool assembly along the plurality of guide bars.

A17. The portable lathe of paragraph A16, wherein the feed stop is mounted on the fixed linear feed element.

A18. The portable lathe of any of paragraphs A16-A17, wherein the feed stop is configured to be selectively positioned in a desired location relative to the plurality of guide bars to selectively vary a location along the plurality of guide bars at which the tool assembly ceases translation when the feed stop engages the clutch stop.

A19. The portable lathe of any of paragraphs A1-A18, wherein the feed assembly further comprises a manual feed input for manually rotating the driving rotary feed element relative to the fixed linear feed element to translate the tool assembly along the plurality of guide bars.

A20. The portable lathe of paragraph A19, wherein the manual feed input is configured to rotate the driving rotary feed element while the rotating portion of the tool assembly is fixed relative to the non-rotating portion of the tool assembly.

A21. The portable lathe of any of paragraphs A19-A20, wherein the manual feed input is mechanically coupled to the driving rotary feed element such that the manual feed input and the driving rotary feed element rotate concurrently.

A22. The portable lathe of any of paragraphs A19-A21, wherein the manual feed input comprises a knob for manually rotating the driving rotary feed element.

A23. The portable lathe of any of paragraphs A1-A22, wherein the feed assembly further comprises a feed motor that is operatively coupled to the driving rotary feed element; wherein the feed motor is configured to rotate the driving rotary feed element relative to the fixed linear feed element to urge the tool assembly to translate along the plurality of guide bars.

A24. The portable lathe of paragraph A23, wherein the feed motor comprises, and optionally is, one or more of an electric motor, a pneumatic motor, and a hydraulic motor.

A25. The portable lathe of any of paragraphs A1-A24, further comprising a rotation motor that is operatively coupled to the tool assembly; wherein the rotation motor is configured to rotate the rotating portion of the tool assembly relative to the non-rotating portion of the tool assembly and about the rotation axis.

A26. The portable lathe of paragraph A25, wherein the rotation motor comprises, and optionally is, one or more of an electric motor, a pneumatic motor, and a hydraulic motor.

A27. The portable lathe of any of paragraphs A25-A26, wherein the rotation motor is fixedly coupled to the non-rotating portion of the tool assembly.

A28. The portable lathe of any of paragraphs A25-A27, wherein the rotating portion of the tool assembly comprises a ring gear, and wherein the rotation motor comprises a pinion gear that engages the ring gear to rotate the rotating portion relative to the non-rotating portion.

A29. The portable lathe of any of paragraphs A1-A28, wherein the tool assembly comprises a roller assembly with a plurality of rollers that operatively couples the rotating portion to the non-rotating portion and that enables the rotating portion to rotate relative to the non-rotating portion.

A30. The portable lathe of any of paragraphs A1-A29, wherein the fixed linear feed element is a first fixed linear feed element, and wherein the feed assembly further comprises:
  a second fixed linear feed element extending between the frame members and at least substantially parallel to the first fixed linear feed element; and
  a driven rotary feed element operatively engaged with the second fixed linear feed element; and
  wherein the feed assembly is configured such that rotation of the driven rotary feed element relative to the second fixed linear feed element causes the driven rotary feed element to translate along the second fixed linear feed element, thereby urging the tool assembly to translate along the plurality of guide bars.

A31. The portable lathe of paragraph A30, wherein the second fixed linear feed element is positioned on an opposite side of the rotation axis relative to the first fixed linear feed element.

A32. The portable lathe of any of paragraphs A30-A31, wherein the second fixed linear feed element is positioned 135°-225° from the first fixed linear feed element about the rotation axis, optionally wherein the second fixed linear feed element is positioned 170°-190° from the first fixed linear feed element about the rotation axis, and further optionally wherein the second fixed linear feed element is positioned at, or approximately at, 180° from the first fixed linear feed element about the rotation axis.

A33. The portable lathe of any of paragraphs A30-A32, wherein the driven rotary feed element is configured to rotate relative to the second fixed linear feed element responsive to the driving rotary feed element rotating relative to the first fixed linear feed element.

A34. The portable lathe of any of paragraphs A30-A33, wherein the driving rotary feed element and the driven rotary feed element are threaded nuts with the same thread configuration.

A35. The portable lathe of any of paragraphs A30-A33, wherein the driving rotary feed element and the driven rotary feed element are threaded nuts with distinct thread configurations.

A36. The portable lathe of any of paragraphs A30-A35, wherein the feed assembly further comprises a drive train that operatively couples the driving rotary feed element and the driven rotary feed element to one another such that the driving rotary feed element and the driven rotary feed element are rotationally coupled to one another.

A37. The portable lathe of paragraph A36, wherein the drive train is configured such that the driving rotary feed element and the driven rotary feed element rotate concurrently.

A38. The portable lathe of any of paragraphs A36-A37, wherein the drive train is configured such that the driving rotary feed element and the driven rotary feed element rotate at least substantially in unison.

A39. The portable lathe of any of paragraphs A36-A38, wherein the drive train is configured such that the driving rotary feed element and the driven rotary feed element rotate with respective rotational velocities that are at least substantially identical.

A40. The portable lathe of any of paragraphs A36-A38, wherein the drive train is configured such that the driving rotary feed element and the driven rotary feed element rotate with respective rotational velocities that are distinct.

A41. The portable lathe of any of paragraphs A36-A40, wherein the drive train comprises:
  a driving gear assembly that comprises the driving rotary feed element;
  a driven gear assembly that comprises the driven rotary feed element; and
  one or more drive shafts operatively coupling the driving gear assembly and the driven gear assembly to one another such that the driving rotary feed element and the driven rotary feed element are rotationally coupled to one another.

A42. The portable lathe of paragraph A41, when dependent from paragraph A7, wherein the driving rotary feed element is a geared driving rotary feed element, and wherein the driving gear assembly is configured to transmit a torque from the rotary feed element actuator to the geared driving rotary feed element when the feed tripper arm actuates the rotary feed element actuator.

A43. The portable lathe of any of paragraphs A41-A42, when dependent from paragraph A7, wherein the driven rotary feed element is a geared driven rotary feed element, and wherein the driven gear assembly is configured to transmit a torque from the one or more drive shafts to the geared driven rotary feed element when the feed tripper arm actuates the rotary feed element actuator.

A44. The portable lathe of any of paragraphs A41-A43, wherein the one or more drive shafts comprises two or more drive shafts, and wherein the drive train further comprises one or more angle gear drives, each of which operatively couples together two or more drive shafts that extend along distinct directions.

A45. The portable lathe of paragraph A44, wherein each angle gear drive comprises one or more bevel gears.

A46. The portable lathe of any of paragraphs A41-A45, when dependent from paragraph A7, wherein the rotary feed element driving assembly is a subassembly of the driving gear assembly.

A47. The portable lathe of any of paragraphs A1-A46, wherein the first fixed linear feed element is a first fixed leadscrew, optionally a ball screw, and wherein the driving rotary feed element is a driving nut, optionally a geared nut and/or a ball screw nut, that is threaded onto the first fixed leadscrew.

A48. The portable lathe of any of paragraphs A1-A46, wherein the first fixed linear feed element is a first fixed gear rack, and wherein the driving rotary feed element is a driving pinion gear that operatively engages the first fixed gear rack.

A49. The portable lathe of any of paragraphs A1-A48, wherein the second fixed linear feed element is a second fixed leadscrew, optionally a ball screw, and wherein the driven rotary feed element is a driven nut, optionally a geared nut and/or a ball screw nut, that is threaded onto the second fixed leadscrew.

A50. The portable lathe of any of paragraphs A1-A48, wherein the second fixed linear feed element is a second fixed gear rack, and wherein the driven rotary feed element is a driven pinion gear that operatively engages the second fixed gear rack.

A51. The portable lathe of any of paragraphs A1-A50, wherein the feed assembly further comprises:
  one or more additional fixed linear feed elements extending between the frame members and at least substantially parallel to the first fixed linear feed element; and
  one or more additional rotary feed elements, each operatively engaged with a respective fixed linear feed element of the one or more additional fixed linear feed elements;
  wherein the feed assembly is configured such that rotation of each additional rotary feed element of the one or more additional rotary feed elements relative to the respective fixed linear feed element causes the rotary feed element to translate along the respective fixed linear feed element, thereby urging the tool assembly to translate along the plurality of guide bars.

A52. The portable lathe of paragraph A51, wherein at least one of the one or more additional rotary feed elements is an additional driving rotary feed element that rotates relative to the respective fixed linear feed element responsive to rotation of the rotating portion of the tool assembly relative to the non-rotating portion of the tool assembly.

A53. The portable lathe of any of paragraphs A51-A52, wherein at least one of the one or more additional rotary feed elements is an additional driven rotary feed element that rotates relative to the respective fixed linear feed element responsive to rotation of one or more of the driving rotary feed element and at least one additional driving rotary feed element.

A54. The portable lathe of any of paragraphs A1-A53, wherein the tool assembly further comprises a cutting assembly supported by the rotating portion, wherein the cutting assembly is configured to revolve around the rotation axis to machine an external surface of the cylindrical workpiece when the portable lathe is operatively installed on the cylindrical workpiece and when the rotating portion rotates relative to the non-rotating portion.

A55. The portable lathe of paragraph A54, wherein the cutting assembly comprises a cutting assembly base operatively coupled to the rotating portion and a cutting tool mount operatively coupled to the cutting assembly base; wherein the cutting tool mount is configured to operatively receive a cutting tool for machining the external surface of the cylindrical workpiece during operative use of the portable lathe.

A56. The portable lathe of paragraph A55, wherein the cutting assembly is configured such that the cutting tool may be selectively mounted to the cutting tool mount at a selected mounting location of a plurality of distinct mounting locations.

A57. The portable lathe of any of paragraphs A55-A56, wherein the cutting tool mount is configured to translate relative to the cutting assembly base along a cutting tool axis that is at least substantially perpendicular to the rotation axis.

A58. The portable lathe of paragraph A57, wherein the cutting tool mount is configured to translate relative to the cutting assembly base along the cutting tool axis responsive to the rotating portion of the tool assembly rotating relative to the non-rotating portion of the tool assembly about the rotation axis.

A59. The portable lathe of any of paragraphs A57-A58, wherein the cutting assembly further comprises:
  a star wheel operatively coupled to the cutting assembly base; and
  a tripper pin operatively coupled to the non-rotating portion of the tool assembly;
  wherein the cutting assembly is configured such that, when the tool assembly rotates past the tripper pin, the tripper pin rotates the star wheel to cause the cutting tool mount to translate relative to the cutting assembly base along the cutting tool axis.

A60. The portable lathe of paragraph A59, wherein the tripper pin is configured to be selectively transitioned between an activated configuration, in which the tripper pin is positioned to engage and rotate the star wheel when the cutting assembly base moves past the tripper pin as the rotating portion rotates relative to the non-rotating portion, and a disabled configuration, in which the tripper pin is positioned to be spaced apart from the star wheel when the cutting assembly base moves past the tripper pin.

A61. The portable lathe of paragraph A60, wherein the cutting assembly is configured such that, when the tripper pin is in the activated configuration and when the portable lathe is operatively installed on the cylindrical workpiece, the cutting tool mount advances toward the cylindrical workpiece along the cutting tool axis when the rotating portion rotates relative to the non-rotating portion to move the tripper pin across the star wheel.

A62. The portable lathe of any of paragraphs A60-A61, wherein the cutting assembly is configured such that the tripper pin may be manually transitioned between the activated configuration and the disabled configuration.

A63. The portable lathe of any of paragraphs A60-A62, wherein the cutting assembly is configured such that the tripper pin may be remotely transitioned between the activated configuration and the disabled configuration.

A64. The portable lathe of any of paragraphs A59-A63, wherein the tripper pin is a first tripper pin of a plurality of tripper pins that are distributed around a circumference of the non-rotating portion of the tool assembly.

A65. The portable lathe of paragraph A64, wherein each tripper pin of the plurality of tripper pins is configured to be selectively and independently transitioned between the activated configuration and the disabled configuration to selectively vary a tool feed rate at which the cutting tool mount translates along a/the cutting tool axis as the rotating portion of the tool assembly rotates relative to the non-rotating portion of the tool assembly.

A66. The portable lathe of any of paragraphs A1-A65, wherein each frame member comprises a first frame clamshell portion and a second frame clamshell portion that are operatively coupled to one another when the portable lathe is operatively installed on the cylindrical workpiece.

A67. The portable lathe of paragraph A66, wherein the first frame clamshell portion and the second frame clamshell portion are configured to be selectively and repeatedly coupled to one another and removed from one another.

A68. The portable lathe of any of paragraphs A66-A67, wherein each frame member comprises a frame clamshell coupling structure for selectively and operatively coupling the first frame clamshell portion and the second frame clamshell portion to one another.

A69. The portable lathe of any of paragraphs A66-A67, wherein the first frame clamshell portion of each frame member comprises a pair of holding tether attachment points; wherein each holding tether attachment point is configured to be selectively and operatively coupled to a corresponding holding tether for securing the cylindrical workpiece to the first frame clamshell portion during assembly of the portable lathe.

A70. The portable lathe of paragraph A69, wherein each holding tether attachment point is configured to be operatively coupled to a holding tether that includes, and optionally is, one or more of a chain and a strap.

A71. The portable lathe of any of paragraphs A69-A70, wherein at least one of the holding tether attachment points comprises a tension adjustment mechanism configured to enable adjustment of a tension of the holding tether around the cylindrical workpiece.

A72. The portable lathe of paragraph A71, wherein the tension adjustment mechanism includes one or more of a turnbuckle, a threaded screw, and an over-center tensioning lever.

A73. The portable lathe of any of paragraphs A1-A72, wherein the tool assembly comprises a first tool assembly clamshell portion and a second tool assembly clamshell portion that are operatively coupled to one another when the portable lathe is operatively installed on the cylindrical workpiece.

A74. The portable lathe of paragraph A73, wherein the first tool assembly clamshell portion and the second tool assembly clamshell portion are configured to be selectively and repeatedly coupled to one another and removed from one another.

A75. The portable lathe of any of paragraphs A73-A74, wherein the tool assembly comprises a tool assembly clamshell coupling structure for selectively and operatively coupling the first tool assembly clamshell portion and the second tool assembly clamshell portion to one another.

A76. The portable lathe of any of paragraphs A1-A75, wherein each frame member comprises a workpiece engagement structure for selectively engaging the cylindrical workpiece when the portable lathe is operatively installed on the cylindrical workpiece.

A77. The portable lathe of paragraph A76, wherein the workpiece engagement structure comprises a clamp ring and a plurality of locator pads operatively coupled to the clamp ring; wherein each locator pad of the plurality of locator pads is configured to engage the cylindrical workpiece when the portable lathe is operatively installed on the cylindrical workpiece.

A78. The portable lathe of paragraph A77, wherein each locator pad of the plurality of locator pads is configured to be selectively translated radially toward and away from the rotation axis to align the cylindrical workpiece within the frame members when the portable lathe is operatively installed on the cylindrical workpiece.

A79. The portable lathe of any of paragraphs A77-A78, wherein the clamp ring is integrally formed with the frame member.

A80. The portable lathe of any of paragraphs A77-A78, wherein the clamp ring is configured to be selectively and operatively coupled to the frame member.

A81. The portable lathe of any of paragraphs A1-A80, wherein each frame member defines a central aperture through which the cylindrical workpiece extends when the portable lathe is operatively installed on the cylindrical workpiece; and wherein the central aperture has an aperture diameter that is one or more of at least 30 centimeters (cm), at least 50 cm, at least 100 cm, at least 130 cm, at least 150 cm, at least 200 cm, at most 220 cm, at most 170 cm, at most 120 cm, at most 70 cm, and at most 40 cm.

A82. The portable lathe of any of paragraphs A1-A81, wherein the plurality of guide bars comprises two guide bars, three guide bars, four guide bars, or more than four guide bars.

A83. The portable lathe of any of paragraphs A1-A82, wherein the feed assembly is configured to translate the tool assembly through an axial range of motion, as measured along a direction at least substantially parallel to the rotation axis, that has a length that is one or more of at least 30 cm, at least 50 cm, at least 100 cm, at least 130 cm, at least 150 cm, at least 200 cm, at most 220 cm, at most 170 cm, at most 120 cm, at most 70 cm, and at most 40 cm.

A84. The portable lathe of any of paragraphs A1-A83, further comprising an operator pendant configured to enable remote control of at least a portion of the portable lathe; wherein the operator pendant is configured to receive a manual input from a human user and to transmit a control signal to one or more other components of the portable lathe based, at least in part, on the manual input.

A85. The portable lathe of paragraph A84, wherein the control signal is configured to selectively transition a/the tripper pin between a/the activated configuration and a/the disabled configuration.

A86. The portable lathe of any of paragraphs A85-A85, wherein the control signal is configured to control a/the rotation motor to initiate and/or cease rotation of the rotating portion of the tool assembly relative to the non-rotating portion of the tool assembly.

A87. The portable lathe of any of paragraphs A84-A86, wherein the control signal is configured control a/the rotation motor to control a rotational velocity with which the rotating portion of the tool assembly rotates relative to the non-rotating portion of the tool assembly.

A88. The portable lathe of any of paragraphs A84-A87, wherein the control signal is configured to operate a/the feed motor to rotate the driving rotary feed element relative to the fixed linear feed element.

B1. A portable lathe assembly kit for operatively installing a portable lathe on a cylindrical workpiece having a longitudinal axis, the portable lathe assembly kit comprising:

two frame members configured to operatively support the portable lathe on the cylindrical workpiece when the portable lathe is operatively installed on the cylindrical workpiece;
a plurality of guide bars configured to extend between and operatively couple the frame members to one another;
a tool assembly configured to be supported by the plurality of guide bars between the frame members and including a non-rotating portion and a rotating portion configured to rotate relative to the non-rotating portion about a rotation axis; wherein the tool assembly is configured to translate along the plurality of guide bars and along a direction at least substantially parallel to the rotation axis when the portable lathe is assembled and operatively supported on the cylindrical workpiece; and
a feed assembly configured to be operatively coupled to the tool assembly and configured to translate the tool assembly along the plurality of guide bars when the portable lathe is assembled and operatively supported on the cylindrical workpiece;
wherein the feed assembly comprises:
a fixed linear feed element configured to extend between the frame members; and
a driving rotary feed element configured to operatively engage the fixed linear feed element;
wherein the feed assembly is configured such that, when the portable lathe is assembled and operatively supported on the cylindrical workpiece, rotation of the driving rotary feed element relative to the fixed linear feed element causes the driving rotary feed element to translate along the fixed linear feed element, thereby urging the tool assembly to translate along the plurality of guide bars.

B2. The portable lathe assembly kit of paragraph B1, wherein the portable lathe assembly kit is a partially assembled portable lathe assembly kit that comprises a first lathe clamshell subassembly and a second lathe clamshell subassembly that are configured to be operatively coupled to one another to operatively install the portable lathe on the cylindrical workpiece.

B3. The portable lathe assembly kit of paragraph B2, wherein each frame member comprises a first frame clamshell portion and a second frame clamshell portion that are configured to be operatively coupled to one another when the portable lathe is operatively installed on the cylindrical workpiece;
wherein the tool assembly comprises a first tool assembly clamshell portion and a second tool assembly clamshell portion that are configured to be operatively coupled to one another when the portable lathe is operatively installed on the cylindrical workpiece;
wherein the first lathe clamshell subassembly comprises the first frame clamshell portion of each frame member operatively coupled to one another by a first subset of the plurality of guide bars and the first tool assembly clamshell portion operatively coupled to the first subset of the plurality of guide bars; and
wherein the second lathe clamshell subassembly comprises the second frame clamshell portion of each frame member operatively coupled to one another by a second subset of the plurality of guide bars and the second tool assembly clamshell portion operatively coupled to the second subset of the plurality of guide bars.

B4. The portable lathe assembly kit of any of paragraphs B2-B3, wherein the fixed linear feed element is a first fixed linear feed element; wherein the portable lathe assembly kit further comprises a second fixed linear feed element and a driven rotary feed element configured to operatively engage the second fixed linear feed element; wherein one of the first lathe clamshell subassembly and the second lathe clamshell subassembly comprises the first fixed linear feed element; and wherein the other of the first lathe clamshell subassembly and the second lathe clamshell subassembly comprises the second fixed linear feed element.

B5. The portable lathe assembly kit of any of paragraphs B1-B4, further comprising the subject matter of any of paragraphs A1-A88.

B6. The portable lathe assembly kit of any of paragraphs B1-B5, wherein the portable lathe is the portable lathe of any of paragraphs A1-A88.

C1. A method of utilizing the portable lathe assembly kit of any of paragraphs B1-66 to operatively install the portable lathe on the cylindrical workpiece, the method comprising operatively receiving the cylindrical workpiece within the frame members.

C2. The method of paragraph C1, wherein the portable lathe assembly kit is a/the partially assembled portable lathe assembly kit comprising a/the first lathe clamshell subassembly and a/the second lathe clamshell subassembly, and wherein the operatively receiving the cylindrical workpiece within the frame members comprises:
  securing the cylindrical workpiece to the first lathe clamshell subassembly; and
  operatively coupling the second lathe clamshell subassembly to the first lathe clamshell subassembly.

C3. The method of paragraph C2, wherein the operatively coupling the second lathe clamshell subassembly to the first lathe clamshell subassembly is performed subsequent to the operatively coupling the cylindrical workpiece to the first lathe clamshell subassembly.

C4. The method of any of paragraphs C2-C3, wherein the securing the cylindrical workpiece to the first lathe clamshell subassembly comprises operatively coupling each holding tether of a pair of holding tethers to a/the pair of holding tether attachment points of a respective one of the two frame members such that the cylindrical workpiece extends between each holding tether and the respective frame member.

C5. The method of paragraph C4, wherein the securing the cylindrical workpiece to the first lathe clamshell subassembly further comprises tightening each holding tether around the cylindrical workpiece, optionally with a/the tension adjustment mechanism of at least one of the holding tether attachment points.

C6. The method of any of paragraphs C4-C5, wherein the securing the cylindrical workpiece to the first lathe clamshell subassembly comprises, prior to the operatively coupling each holding tether to the pair of holding tether attachment points, positioning the cylindrical workpiece on top of the first lathe clamshell subassembly.

C7. The method of any of paragraphs C4-C5, wherein the securing the cylindrical workpiece to the first lathe clamshell subassembly comprises:
  prior to the operatively coupling each holding tether to the pair of holding tether attachment points, positioning the first lathe clamshell subassembly at least substantially on a lateral side of the cylindrical workpiece; and
  subsequent to the operatively coupling each holding tether to the pair of holding tether attachment points, positioning the first lathe clamshell subassembly at least substantially on a bottom side of the cylindrical workpiece.

C8. The method of any of paragraphs C2-C7, wherein the operatively coupling the second lathe clamshell subassembly to the first lathe clamshell subassembly comprises one or both of:
  operatively coupling the first frame clamshell portion to the second frame clamshell portion of each frame member with a/the respective frame clamshell coupling structure; and
  operatively coupling the first tool assembly clamshell portion to the second tool assembly clamshell portion with a/the tool assembly clamshell coupling structure.

C9. The method of any of paragraphs C1-C8, wherein the operatively receiving the cylindrical workpiece within the frame members comprises operatively engaging the cylindrical workpiece with a/the workpiece engagement structure of each frame member.

C10. The method of any of paragraphs C1-C9, further comprising defining a/the axial range of motion of the tool assembly.

C11. The method of paragraph C10, wherein the defining the axial range of motion of the tool assembly comprises one or both of:
  (i) positioning the tool assembly along the plurality of guide bars at a machining start location; and
  (ii) positioning a/the feed stop relative to the plurality of guide bars at a location corresponding to a machining stop location.

C12. The method of paragraph C11, wherein the positioning the tool assembly along the plurality of guide bars comprises translating the tool assembly along the plurality of guide bars with a/the manual feed input.

C13. The method of any of paragraphs C1-C12, wherein the fixed linear feed element is a/the first fixed linear feed element; wherein the portable lathe assembly kit further comprises a/the second fixed linear feed element and a/the driven rotary feed element configured to operatively engage the second fixed linear feed element; and wherein the method further comprises operatively coupling the driving rotary feed element and the driven rotary feed element to one another such that the driving rotary feed element and the driven rotary feed element are rotationally coupled to one another.

C14. The method of paragraph C13, wherein the portable lathe assembly kit further comprises a/the drive train configured to operatively couple the driving rotary feed element and the driven rotary feed element to one another; wherein the drive train comprises a/the driving gear assembly, a/the driven gear assembly, and (the) one or more drive shafts for operatively coupling the driving gear assembly and the driven gear assembly to one another, and wherein the operatively coupling the driving rotary feed element and the driven rotary feed element to one another comprises installing the one or more drive shafts to extend between the driving gear assembly and the driven gear assembly.

C15. The method of paragraph C14, wherein the one or more drive shafts comprises at least a first drive shaft and a second drive shaft, and wherein the installing the one or more drive shafts comprises operatively coupling the first drive shaft and the second drive shaft to one another with an angle gear drive such that the first drive shaft and the second drive shaft extend along distinct directions.

C16. The method of any of paragraphs C1-C15, wherein the tool assembly comprises a/the cutting assembly with a/the cutting assembly base operatively coupled to the rotating portion of the tool assembly, a/the cutting tool mount operatively coupled to the cutting assembly base, and a/the cutting tool configured to be operatively coupled to the cutting tool mount, and wherein the method further comprises one or both of:
  (i) operatively coupling the cutting tool to the cutting tool mount, optionally at a selected mounting location of a/the plurality of distinct mounting locations; and
  (ii) translating the cutting tool mount relative to the cutting assembly base along a/the cutting tool axis to position the cutting tool relative to the cylindrical workpiece.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It also is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure, the preceding numbered paragraphs, or the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A portable lathe assembly kit for operatively installing a portable lathe on a cylindrical workpiece having a longitudinal axis, the portable lathe assembly kit comprising:
    two frame members configured to operatively support the portable lathe on the cylindrical workpiece when the portable lathe is operatively installed on the cylindrical workpiece;
    a plurality of guide bars configured to extend between and operatively couple the frame members to one another;
    a tool assembly configured to be supported by the plurality of guide bars between the frame members and including a non-rotating portion and a rotating portion configured to rotate relative to the non-rotating portion about a rotation axis; wherein the tool assembly is configured to translate along the plurality of guide bars and along a direction at least substantially parallel to the rotation axis when the portable lathe is assembled and operatively supported on the cylindrical workpiece; and
    a feed assembly configured to be operatively coupled to the tool assembly and configured to translate the tool assembly along the plurality of guide bars when the portable lathe is assembled and operatively supported on the cylindrical workpiece;
    wherein the feed assembly comprises:
        a first fixed linear feed element configured to extend between the frame members;
        a driving rotary feed element operatively coupled to the tool assembly and configured to operatively engage the first fixed linear feed element;
        a second fixed linear feed element configured to extend between the frame members and at least substantially parallel to the first fixed linear feed element; and
        a driven rotary feed element configured to operatively engage the second fixed linear feed element; and
    wherein the feed assembly is configured such that rotation of the driving rotary feed element relative to the first fixed linear feed element causes the driving rotary feed element to translate along the first fixed linear feed element and rotation of the driven rotary feed element relative to the second fixed linear feed element causes the driven rotary feed element to translate along the second fixed linear feed element, thereby urging the tool assembly to translate along the plurality of guide bars.

2. The portable lathe assembly kit of claim 1, wherein the portable lathe assembly kit is a partially assembled portable lathe assembly kit that comprises a first lathe clamshell subassembly and a second lathe clamshell subassembly that are configured to be operatively coupled to one another to operatively install the portable lathe on the cylindrical workpiece; wherein each frame member comprises a first frame clamshell portion and a second frame clamshell portion that are configured to be operatively coupled to one another when the portable lathe is operatively installed on the cylindrical workpiece;
    wherein the tool assembly comprises a first tool assembly clamshell portion and a second tool assembly clamshell portion that are configured to be operatively coupled to one another when the portable lathe is operatively installed on the cylindrical workpiece;
    wherein the first lathe clamshell subassembly comprises the first frame clamshell portion of each frame member operatively coupled to one another by a first subset of the plurality of guide bars and the first tool assembly clamshell portion operatively coupled to the first subset of the plurality of guide bars; and
    wherein the second lathe clamshell subassembly comprises the second frame clamshell portion of each frame member operatively coupled to one another by a second subset of the plurality of guide bars and the second tool assembly clamshell portion operatively coupled to the second subset of the plurality of guide bars.

3. A method of utilizing the portable lathe assembly kit of claim 2 to operatively install the portable lathe on the cylindrical workpiece, the method comprising operatively receiving the cylindrical workpiece within the frame members; and wherein the operatively receiving the cylindrical workpiece within the frame members comprises:
    securing the cylindrical workpiece to the first lathe clamshell subassembly; and
    operatively coupling the second lathe clamshell subassembly to the first lathe clamshell subassembly.

4. The method of claim 3, wherein the operatively coupling the second lathe clamshell subassembly to the first lathe clamshell subassembly is performed subsequent to the operatively coupling the cylindrical workpiece to the first lathe clamshell subassembly.

5. The method of claim 4, wherein the first frame clamshell portion of each frame member comprises a pair of holding tether attachment points; wherein each holding tether attachment point is configured to be selectively and operatively coupled to a corresponding holding tether of a pair of holding tethers for securing the cylindrical workpiece to the first frame clamshell portion during assembly of the portable lathe; and wherein the securing the cylindrical workpiece to the first lathe clamshell subassembly comprises operatively coupling each holding tether of the pair of holding tethers to the pair of holding tether attachment points of a respective frame member of the two frame members such that the cylindrical workpiece extends between each holding tether and the respective frame member.

6. The method of claim 5, wherein the securing the cylindrical workpiece to the first lathe clamshell subassembly comprises, prior to the operatively coupling each holding tether to the pair of holding tether attachment points, positioning the cylindrical workpiece on top of the first lathe clamshell subassembly.

7. The method of claim 5, wherein the securing the cylindrical workpiece to the first lathe clamshell subassembly comprises:
- prior to the operatively coupling each holding tether to the pair of holding tether attachment points, positioning the first lathe clamshell subassembly at least substantially on a lateral side of the cylindrical workpiece; and
- subsequent to the operatively coupling each holding tether to the pair of holding tether attachment points, positioning the first lathe clamshell subassembly at least substantially on a bottom side of the cylindrical workpiece.

8. The method of claim 5, wherein the portable lathe assembly kit further comprises a drive train that is configured to operatively couple the driving rotary feed element and the driven rotary feed element to one another such that the driving rotary feed element and the driven rotary feed element are rotationally coupled to one another; wherein the drive train comprises:
- a driving gear assembly that comprises the driving rotary feed element;
- a driven gear assembly that comprises the driven rotary feed element; and
- one or more drive shafts configured to operatively couple the driving gear assembly and the driven gear assembly to one another such that the driving rotary feed element and the driven rotary feed element are rotationally coupled to one another; and
- wherein the operatively coupling the driving rotary feed element and the driven rotary feed element to one another comprises installing the one or more drive shafts to extend between the driving gear assembly and the driven gear assembly.

9. The portable lathe assembly kit of claim 1,
wherein the driving rotary feed element is configured to rotate relative to the first fixed linear feed element responsive to the rotation of the rotating portion of the tool assembly relative to the non-rotating portion of the tool assembly;
wherein the feed assembly further comprises:
- a rotary feed element driving assembly operatively coupled to the driving rotary feed element and including a rotary feed element actuator; and
- a feed tripper arm coupled to the rotating portion of the tool assembly;

wherein the rotary feed element driving assembly is configured to rotate the driving rotary feed element relative to the first fixed linear feed element responsive to the feed tripper arm engaging and actuating the rotary feed element actuator; and wherein the feed assembly is configured such that the rotation of the rotating portion of the tool assembly relative to the non-rotating portion of the tool assembly causes the feed tripper arm to move past and engage the rotary feed element actuator, thereby actuating the rotary feed element actuator to rotate the driving rotary feed element relative to the first fixed linear feed element.

10. The portable lathe assembly kit of claim 9, wherein the feed assembly further comprises a drive train that operatively couples the driving rotary feed element and the driven rotary feed element to one another such that the driving rotary feed element and the driven rotary feed element are rotationally coupled to one another; wherein the drive train is configured such that the driving rotary feed element and the driven rotary feed element rotate at least substantially in unison; wherein the drive train comprises:
- a driving gear assembly that comprises the driving rotary feed element;
- a driven gear assembly that comprises the driven rotary feed element; and
- one or more drive shafts operatively coupling the driving gear assembly and the driven gear assembly to one another such that the driving rotary feed element and the driven rotary feed element are rotationally coupled to one another; and
- wherein the driving rotary feed element is a geared driving rotary feed element; wherein the driven rotary feed element is a geared driven rotary feed element; wherein the driving gear assembly is configured to transmit a torque from the rotary feed element actuator to the geared driving rotary feed element when the feed tripper arm actuates the rotary feed element actuator; and wherein the driven gear assembly is configured to transmit a torque from the one or more drive shafts to the geared driven rotary feed element when the feed tripper arm actuates the rotary feed element actuator.

* * * * *